United States Patent
Uchino

(10) Patent No.: US 7,420,503 B2
(45) Date of Patent: Sep. 2, 2008

(54) SMALL-SIZED LOW-POWER DISSIPATION SHORT-RANGE RADAR THAT CAN ARBITRARILY CHANGE DELAY TIME BETWEEN TRANSMISSION AND RECEPTION WITH HIGH TIME RESOLUTION AND METHOD OF CONTROLLING THE SAME

(75) Inventor: Masaharu Uchino, Aiko-gun (JP)

(73) Assignee: Anritsu Corporation, Tokyo (JP)

( * ) Notice: Subject to any disclaimer, the term of this patent is extended or adjusted under 35 U.S.C. 154(b) by 268 days.

(21) Appl. No.: 10/581,935

(22) PCT Filed: Oct. 7, 2005

(86) PCT No.: PCT/JP2005/018662

§ 371 (c)(1),
(2), (4) Date: Jun. 7, 2006

(87) PCT Pub. No.: WO2006/041042

PCT Pub. Date: Apr. 20, 2006

(65) Prior Publication Data

US 2007/0132633 A1  Jun. 14, 2007

(30) Foreign Application Priority Data

Oct. 14, 2004  (JP) ............................. 2004-300320

(51) Int. Cl.
G01S 13/00 (2006.01)

(52) U.S. Cl. .......................... 342/70; 342/108; 342/84; 342/85; 342/91; 342/92

(58) Field of Classification Search ................... 342/68, 342/70–75, 82–85, 128–135, 187–201
See application file for complete search history.

(56) References Cited

U.S. PATENT DOCUMENTS 7,095,363 B2 * 8/2006 Ishii et al. ..................... 342/70

2003/0085834 A1  5/2003 Okamura

FOREIGN PATENT DOCUMENTS

JP  5-312938 A  11/1993

(Continued)

OTHER PUBLICATIONS

I. Gresham et al; A Low Noise Broadband SiGe Mixer for 24GHz Ultra-Wideband Automotive Applications; Radio and Wireless Conference, 2003, RAWCON 2003; Aug. 2003; pp. 361-364.

(Continued)

*Primary Examiner*—Thomas H. Tarcza
*Assistant Examiner*—Timothy A Brainard
(74) *Attorney, Agent, or Firm*—Frishauf, Holtz, Goodman & Chick, P.C.

(57) ABSTRACT

In a configuration according to a short-range radar of the present invention and a method of controlling the same, the timing at which a variable-period pulse output from a variable-period pulse generator including a direct digital synthesizer (DDS) has shifted in level first since reception of a search instruction is used as a reference timing, so that a signal that shifts in level at the reference timing or a fixed lapse of time later than the reference timing is generated and output as a transmission trigger signal, and a signal that shifts in level at a timing delayed by half a period of the variable-period pulse or its integral multiple from the timing at which the transmission trigger signal is output is generated and output as a reception trigger signal. With this, by varying beforehand frequency data of the DDS based on the relationship between the frequency data and delay time between transmission and reception stored in a memory, it is possible to vary delay time between the transmission trigger signal and the reception trigger signal. It is thus possible to arbitrarily vary the delay time between transmission and reception at a high time resolution by using a simple configuration and low power dissipation.

32 Claims, 10 Drawing Sheets

FOREIGN PATENT DOCUMENTS

| | | |
|---|---|---|
| JP | 7-12921 A | 1/1995 |
| JP | 8-313619 A | 11/1996 |
| JP | 2003-139846 A | 5/2003 |
| JP | 2003-0139846 A | 5/2003 |

OTHER PUBLICATIONS

Notification Concerning Transmittal of Copy of International Preliminary Report on Patentability, Chapter 1 of the Patent Cooperation Treaty, and Written Opinion of the International Searching Authority, dated Apr. 17, 2007, for PCT/JP2005/018662, 6 sheets.

W2.3, Gresham, Ian, et al, "A Low-Noise Broadband SiGe Mixer for 24GHz Ultra-Wideband Automotive Applications", M/A-COM Corporate Research and Development, Lowell, MA, 0-7803-7829-6/03/ 2000 IEEE,PP. 361-364.

* cited by examiner

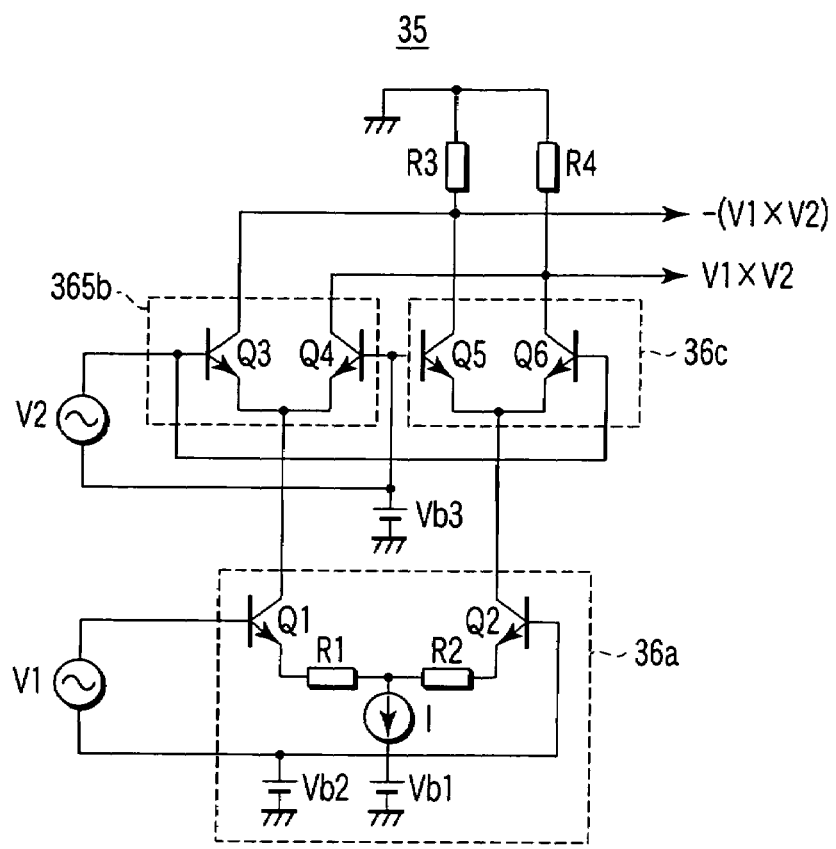
F I G. 4
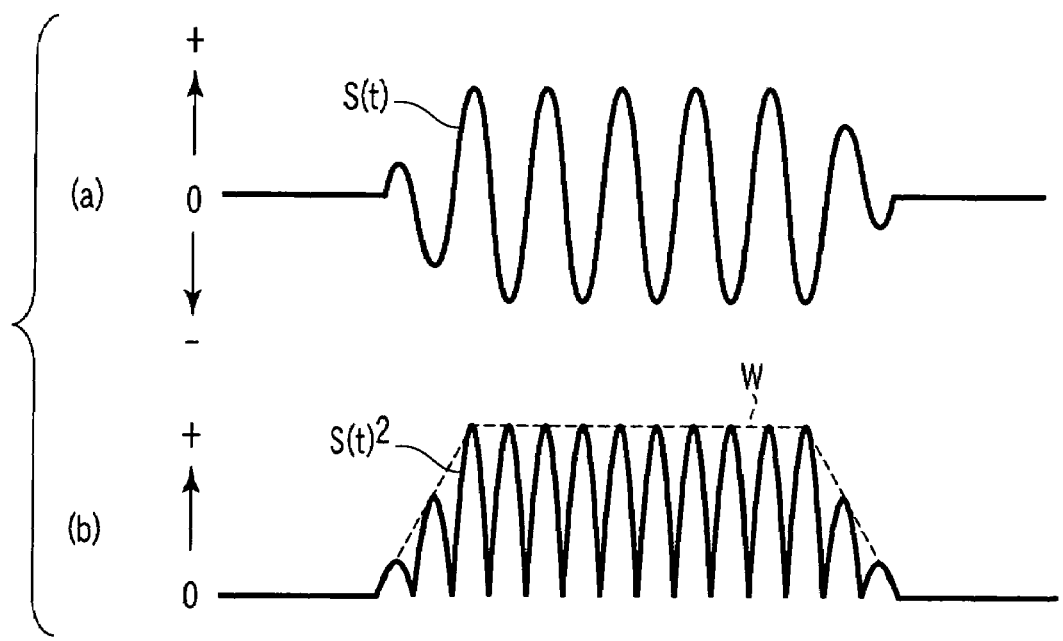
F I G. 5

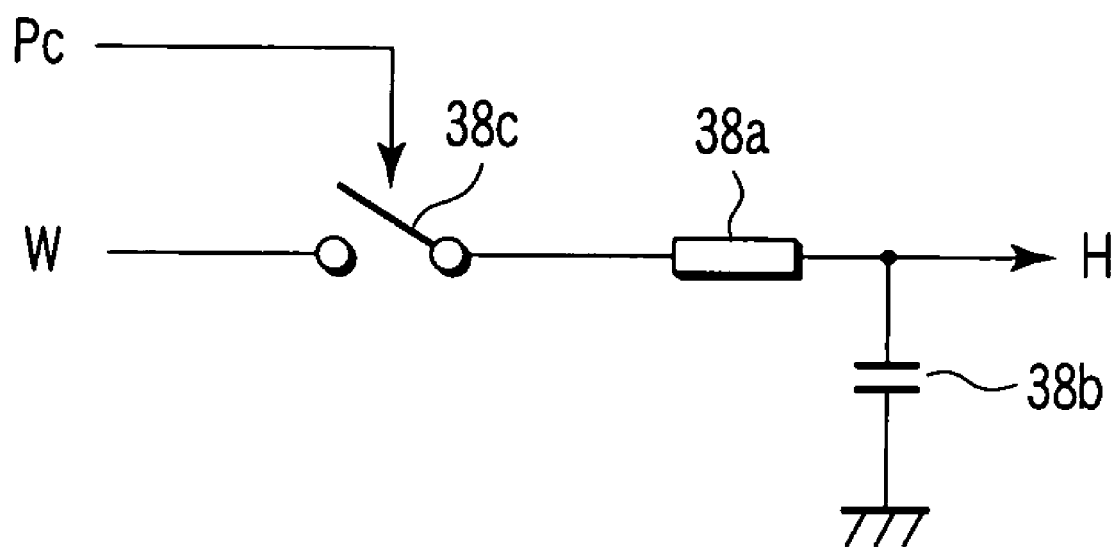
F I G. 6

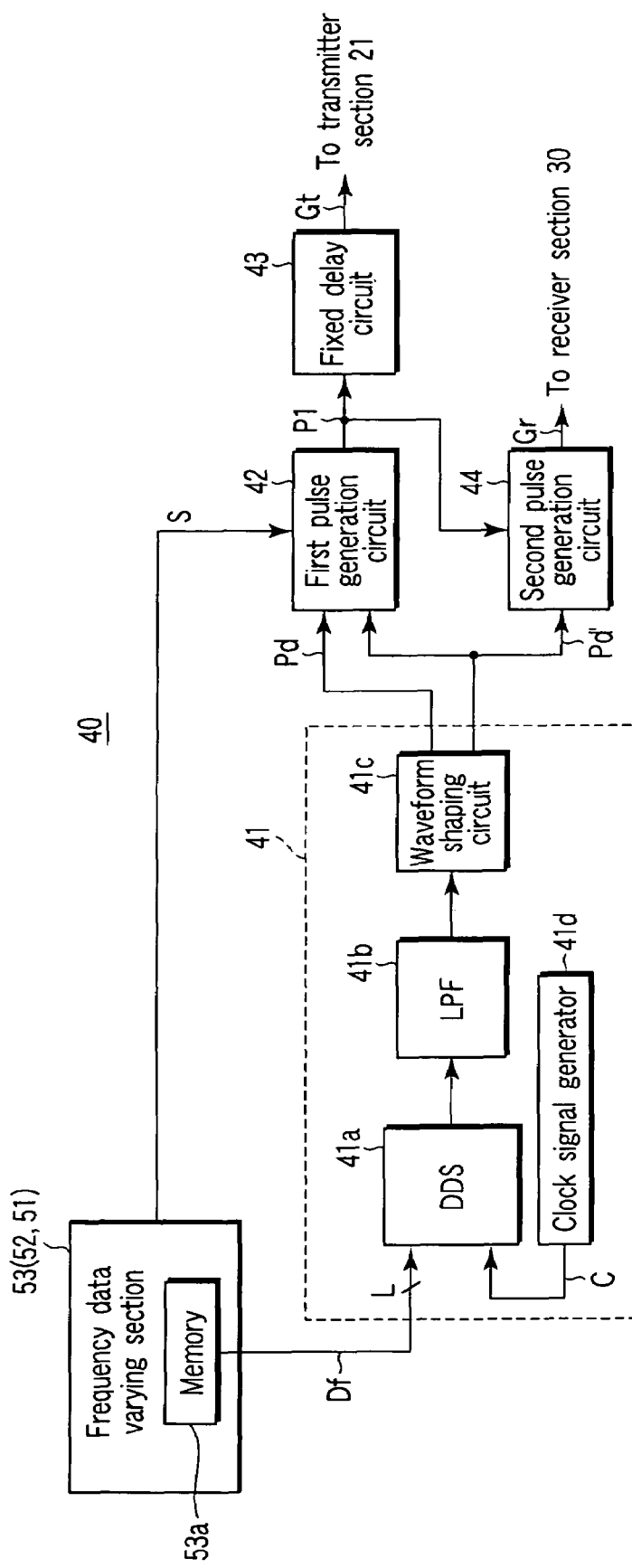
F I G. 7

| Df | fd | Td | Tr |
|---|---|---|---|
| $23 \times 2^{26} \fallingdotseq 1.54 \times 10^9$ | 71.875MHz | 13.9ns | 0ns |
| $603 \times 2^{20} \fallingdotseq 6.32 \times 10^8$ | 29.443MHz | 33.96ns | 9.982ns |
| $33 \times 2^{15} \fallingdotseq 1.08 \times 10^6$ | 50.35KHz | 20μs | 10μs |
| $602 \times 2^{20} \fallingdotseq 6.31 \times 10^8$ | 29.395MHz | 34.02ns | 10.01ns |

F I G. 11

SMALL-SIZED LOW-POWER DISSIPATION SHORT-RANGE RADAR THAT CAN ARBITRARILY CHANGE DELAY TIME BETWEEN TRANSMISSION AND RECEPTION WITH HIGH TIME RESOLUTION AND METHOD OF CONTROLLING THE SAME

This application is a U.S. National Phase Application under 35 USC 371 of International Application PCT/JP2005/018662 filed Oct. 7, 2005.

TECHNICAL FIELD

The present invention relates to a short-range radar and a method of controlling the same, and more specifically, to a short-range radar employing a technology that can realize a short-range radar for use in an ultra-wide band (UWB) of 22 to 29 GHz allocated to automotive radars or walking assist radars for the visually impaired, etc., in a simple and small-sized configuration with low-power dissipation and that can arbitrarily change delay time between transmission and reception with a high time resolution in order to enhance a distance resolution, especially, of those short-range radars for radiating a narrow pulse wave (short pulse wave) into space in a predetermined period and receiving and detecting a reflected wave from an object present in the space to analyze the object based on the detected output; and a method of controlling the same.

BACKGROUND ART

A conventionally known pulse radar for searching for an object in space by using a pulse wave basically has such a configuration as shown in FIG. 10.

That is, in a pulse radar 10 shown in FIG. 10, a transmitter section 11, when having received a trigger signal G output from a later-described control section 16 in a predetermined period Tg, generates a pulse wave Pt having a predetermined width and a predetermined carrier frequency that are synchronized with the trigger signal G and radiates it into space via a transmission antenna 11a.

This pulse wave Pt is reflected by an object 1a present in space 1, so that its reflected wave Pr is received by a reception antenna 12a and then detected by a receiver section 12.

A signal processing section 15 analyzes the object 1a present in the space 1 based on a timing at which a detected output D is output from the receiver section 12 with respect to a reference timing, for example, at which the pulse wave is sent from the transmitter section 11 and also based on an output waveform of the pulse wave.

The control section 16 provides various control items on the transmitter section 11 and the receiver section 12 based on results of processing by the signal processing section 15, etc.

It is to be noted that a basic configuration of such a pulse radar 10 is disclosed in the following Patent Documents 1 and 2:

Patent Document 1: Jpn. Pat. Appln. KOKAI Publication No. 7-012921
Patent Document 2: Jpn. Pat. Appln. KOKAI Publication No. 8-313619

The following two types of pulse radar are considered automotive radars being put into practical use recently of those pulse radars that have such a basic configuration.

A first type pulse radar is being developed as something that uses a millimeter waveband frequency (77 GHz) to search a long-distance narrow-angle range with high power for the purpose of assisting in high-speed driving such as prevention of collision of an automobile and driving control.

A second type pulse radar is being developed as something that uses a sub-millimeter waveband frequency (22 to 29 GHz) to search a short-distance wide-angle range with low power for the purpose of assisting in low-speed driving such as recognition of a blind spot of an automobile and parallel parking.

The sub-millimeter waveband for use in the second type pulse radar is generally referred to as an ultra-wide band (UWB) and utilized not only in an automotive radar but also in a medical radar, a walking assist radar for the visually impaired and a short-distance communication system, etc.

Since the UWB is wide, a short pulse having a width of 1 ns or less can be used in a radar system, so that it is expected to realize a short-range radar that has a high distance resolution.

DISCLOSURE OF INVENTION

However, to actually realize a short-range radar that uses the UWB and has a high distance resolution, there are a variety of later-described problems to be solved.

One of the most important targets is to enable obtaining a high distance resolution in an operation mode to selectively receive a reflected wave from a desired distance region of an entire search range.

That is, in case of realizing such an operation mode for selectively receiving a reflected wave from a desired distance region, it is necessary to generate a time delay from a moment of radiation of a short pulse to a moment of start of reception of a reflected wave from an object present in space, accurately with at least a resolution of a width of the short pulse (e.g., 1 ns).

Conventionally, to arbitrarily obtain delay time having such a high time resolution, a method has been used for combining many fixed delay lines having different delay time values.

However, such a method for combining many fixed delay lines increases a size of a configuration of an apparatus as a short-range radar, thus having a problem of being unsuitable for a short-range radar utilizing the UWB because this type of radar may have to be installed in various types of vehicles or cell phones.

Further, a delay line has a larger error as its delay time becomes longer, so that even if a plurality of fixed delay lines are combined as described above to obtain desired delay time, an error becomes too large, thus resulting in a problem that it is impossible to realize a short-range radar that utilizes the UWB and has a high distance resolution by using the method of combining many fixed delay lines.

According to another method of arbitrarily obtaining delay time electrically, it is possible to realize a configuration for counting high-speed clock signals by using a counter, to start reception at a timing at which a resultant count is equal to a preset value.

However, the method of obtaining arbitrary delay time electrically has a problem of larger power dissipation of a 1-GHz multi-digit counter required to obtain arbitrary delay time at a resolution of 1 ns.

A further method may be available for jointly using these methods in such a way as to coarsely adjust delay time by the method of obtaining arbitrary delay time electrically by using such a counter, and also to finely adjust it by the method of combining many fixed delay lines as described above.

However, such a joint method has a problem that a configuration for switchover of the above-described many fixed delay lines increases a size of a configuration of an apparatus as a short-range radar.

The present invention has been developed to solve the above problems of the prior art, and it is an object of the present invention to provide a short-range radar that has a simple configuration and low power dissipation and can arbitrarily change delay time between transmission and reception at a high time resolution, and a method of controlling the same.

In order to achieve the above object, according to a first aspect of the present invention, there is provided a short-range radar comprising:

a transmitter section (21) which radiates a short pulse wave (Pt) having a predetermined width into space (1) each time receiving a transmission trigger signal (Gt);

a receiver section (30) which performs reception and detection processing on a reflected wave (Pr) of the short pulse wave (Pt) when having received a reception trigger signal (Gr);

a variable-period pulse generator (41) including a direct digital synthesizer (41a) which outputs a signal having a frequency corresponding to frequency data (Df) specified from an outside, the variable-period pulse generator generating a variable-period pulse (Pd, Pd') whose period changes in accordance with the frequency data;

a first pulse generation circuit (42) which receives the variable-period pulse (Pd, Pd') generated by the variable-period pulse generator (41), and which outputs a first pulse whose level shifts in a predetermined direction as the transmission trigger signal (Gt) at a reference timing that is assumed to be a timing at which a level of the variable-period pulse shifts in a predetermined direction first since a search instruction is input;

a second pulse generation circuit (44) which receives the variable-period pulse (Pd') generated by the variable-period pulse generator (41), and which outputs as the reception trigger signal (Gr) a second pulse whose level shifts in a predetermined direction at a timing when the level of the variable-period pulse has shifted in a direction opposite to the first predetermined direction after the reference timing;

a trigger signal generating section (40') including the variable-period pulse generator (41), the first pulse generation circuit (42), and the second pulse generation circuit (44), the trigger signal generating section outputting the transmission trigger signal (Gt) from the first pulse generation circuit (42) to the transmitter section (21) each time the variable-period pulse generator (41) receives the search instruction, and also outputting from the second pulse generation circuit (44) to the receiver section (30) as the reception trigger signal (Gr) a signal that is delayed by an arbitrary lapse of time with respect to the transmission trigger signal (Gt) in order to give delay time (Tr) between transmission and reception; and a frequency data varying section (53) including a memory (53a) in which a relationship between the frequency data (Df) and the delay time (Tr) between transmission and reception is stored beforehand in a form of a table of computation expressions or calculation results, the frequency data varying section varying the frequency data (Df) destined for the direct digital synthesizer (41a) in the variable-period pulse generator (41) based on the relationship between the frequency data (Df) and the delay time (Tr) between transmission and reception stored in the memory (53a), thereby enabling arbitrarily varying delay time of the reception trigger signal (Gr) with respect to the transmission trigger signal (Gt).

In order to achieve the above object, according to a second aspect of the present invention, there is provided a short-range radar according to the first aspect, further comprising:

a fixed delay circuit (43) which gives a delay (Tk) of a fixed lapse of time to the first pulse from the first pulse generation circuit (42), and which outputs it as the transmission trigger signal (Gt), wherein the second pulse generation circuit (44), when having received the variable-period pulse generated by the variable-period pulse generator, outputs the reception trigger signal (Gr) at a timing when a lapse of time equal to an integral multiple of half a period of the variable-period pulse from the variable-period pulse generator (41) and longer than the fixed lapse of time has elapsed since the reference timing.

In order to achieve the above object, according to a third aspect of the present invention, there is provided a short-range radar according to the first aspect, wherein the receiver section (30) comprises:

a branch circuit (35) which divides in-phase a signal (R') of the reflected wave (Pr) of the short pulse wave (Pt) radiated into the space (1) by the transmitter section (21) into first and second signals (V1, V2);

a linear multiplier (36) which linear-multiplies the first and second signals (V1, V2) that have been divided in-phase by the branch circuit (35); and a detector circuit (34) configured by a low-pass filter (37) which extracts a base band component from an output signal of the linear multiplier (36), and the short-range radar further comprises:

a signal processing section (51) which performs analysis processing on an object (1a) present in the space (1) based on an output of the receiver section (30); and a control section (52) which performs predetermined control on at least one of the transmitter section (21) and the receiver section (30) based on a result of analysis by the signal processing section (51).

In order to achieve the above object, according to a fourth aspect of the present invention, there is provided a short-range radar according to the third aspect, wherein the linear multiplier (36) in the detector circuit (34) is configured by a Gilbert mixer.

In order to achieve the above object, according to a fifth aspect of the present invention, there is provided a short range radar according to the third aspect, wherein the receiver section (30) has a sample-and-hold circuit (38) which integrates an output signal of the detector circuit (34) and which holds and outputs a result of the integration.

In order to achieve the above object, according to a sixth aspect of the present invention, there is provided a short-range radar according to the fifth aspect, wherein the control section (52) variably controls an integration start timing and integration time of the sample-and-hold circuit (38) based on a result of processing by the signal processing section (51).

In order to achieve the above object, according to a seventh aspect of the present invention, there is provided a short-range radar according to the third aspect, wherein the transmitter section (21) is provided with a power amplifier (25) which amplifies the short pulse wave and the receiver section (30) is provided with a low-noise amplifier (32) which amplifies a signal (R) of the reflected wave (Pr), and the control section (52) controls a gain of at least one of the power amplifier (25) provided to the transmitter section (21) and the low-noise amplifier (32) provided to the receiver section (30) such that a level of the signal (R') of the reflected wave (Pr) input to the detector circuit (34) falls in a linear-operation range of the linear-multiplier (36) in the receiver section (30).

In order to achieve the above object, according to an eighth aspect of the present invention, there is provided a short-range radar according to the first aspect, wherein the transmitter section (21) is provided with a pulse generator (23) which generates a pulse signal (Pa) having a predetermined width and an oscillator (24) which oscillates and provides an output signal (Pb) as the short pulse wave (Pt) only in a period in which the pulse signal (Pa) from the pulse generator (23) is being input, the oscillator stopping oscillation in a period in which the pulse signal (Pa) is not being input.

In order to achieve the above object, according to a ninth aspect of the present invention, there is provided a short-range radar comprising:

a transmitter section (21) which radiates a short pulse wave (Pt) having a predetermined width into space (1) each time receiving a transmission trigger signal (Gt);

a receiver section (30) which performs reception and detection processing on a reflected wave (Pr) of is the short pulse wave (Pt) when having received a reception trigger signal (Gr);

a variable-period pulse generator (41) including a direct digital synthesizer (41a) which outputs a signal having a frequency corresponding to frequency data (Df) specified from an outside based on a search instruction, the variable-period pulse generator generating a variable-period pulse whose period changes in accordance with the frequency data (Df);

a first pulse generation circuit (42) which receives the variable-period pulse generated by the variable-period pulse generator (41), and which outputs a first pulse at a reference timing that is assumed to be a timing at which a level of the variable-period pulse rises or falls;

a fixed delay circuit (43) which gives a delay (Tk) of a fixed lapse of time to the first pulse from the first pulse generation circuit (42), and which outputs it as the transmission trigger signal (Gt);

a second pulse generation circuit (44) which receives the variable-period pulse generated by the variable-period pulse generator (41), and which outputs the reception trigger signal (Gr) at a timing when a lapse of time that is equal to an integral multiple of half a period of the variable-period pulse and longer than the fixed lapse of time has elapsed since the reference timing;

a trigger signal generating section (40) including the variable-period pulse generator (41), the first pulse generation circuit (42), the fixed delay circuit (43), and the second pulse generation circuit (44), the trigger signal generating section outputting the transmission trigger signal (Gt) from the fixed delay circuit (43) to the transmitter section (21) each time the variable-period pulse generator (41) receives the search instruction, and also outputting from the second pulse generation circuit (44) to the receiver section (30) as the reception trigger signal (Gr) a signal that is delayed by an arbitrary lapse of time with respect to the transmission trigger signal (Gt) in order to give delay time (Tr) between transmission and reception; and a frequency data varying section (53) including a memory (53a) in which a relationship between the frequency data (Df) and the delay time (Tr) between transmission and reception is stored beforehand in a form of a table of computation expressions or calculation results, the frequency data varying section varying the frequency data (Df) destined for the direct digital synthesizer (41a) in the variable-period pulse generator (41) based on the relationship between the frequency data (Df) and the delay time (Tr) between transmission and reception stored in the memory (53a), thereby enabling arbitrarily varying delay time of the reception trigger signal (Gr) with respect to the transmission trigger signal (Gt).

In order to achieve the above object, according to a tenth aspect of the present invention, there is provided a short-range radar according to the ninth aspect, wherein the first pulse generation circuit (42) outputs a first pulse whose level rises at the reference timing, and the second pulse generation circuit (44), when having received the variable-period pulse generated by the variable-period pulse generator (41), outputs as the reception trigger signal (Gr) a signal whose level rises at a timing when a lapse of time equal to an integral multiple of half a period of the variable-period pulse and longer than the fixed lapse of time has elapsed since the reference timing.

In order to achieve the above object, according to an eleventh aspect of the present invention, there is provided a short-range radar according to the ninth aspect, wherein the receiver section (30) comprises:

a branch circuit (35) which divides in-phase a signal (R') of the reflected wave (Pr) of the short pulse wave (Pt) radiated into the space (1) by the transmitter section (21) into first and second signals (V1, V2);

a linear multiplier (36) which linear-multiplies the first and second signals (V1, V2) that have been divided in-phase by the branch circuit (35); and a detector circuit (34) configured by a low-pass filter (37) which extracts a baseband component from an output signal of the linear multiplier (36), and the short-range radar further comprises:

a signal processing section (51) which performs analysis processing on an object (1a) present in the space (1) based on an output of the receiver section (30); and a control section (52) which performs predetermined control on at least one of the transmitter section (21) and the receiver section (30) based on a result of analysis by the signal processing section (51).

In order to achieve the above object, according to a twelfth aspect of the present invention, there is provided a short-range radar according to the eleventh aspect, wherein the linear multiplier (36) in the detector circuit (34) is configured by a Gilbert mixer.

In order to achieve the above object, according to a thirteenth aspect of the present invention, there is provided a short-range radar according to the eleventh aspect, wherein the receiver section (30) has a sample-and-hold circuit (38) which integrates an output signal of the detector circuit (34) and which holds and outputs a result of the integration.

In order to achieve the above object, according to a fourteenth aspect of the present invention, there is provided a short-range radar according to the thirteenth aspect, wherein the control section (52) variably controls an integration start timing and integration time of the sample-and-hold circuit (38) based on a result of processing by the signal processing section (51).

In order to achieve the above object, according to a fifteenth aspect of the present invention, there is provided a short-range radar according to the eleventh aspect, wherein the transmitter section (21) is provided with a power amplifier (25) which amplifies the short pulse wave (Pt) and the receiver section (30) is provided with a low-noise amplifier (32) which amplifies a signal (R) of the reflected wave (Pr), and the control section (52) controls a gain of at least one of the power amplifier (25) provided to the transmitter section (21) and the low-noise amplifier (32) provided to the receiver section (30) such that a level of the signal (R') of the reflected wave (Pr) input to the detector circuit (34) falls in a linear-operation range of the linear-multiplier (36) in the receiver section (30).

In order to achieve the above object, according to a sixteenth aspect of the present invention, there is provided a short-range radar according to the ninth aspect, wherein the transmitter section (21) is provided with a pulse generator (23) which generates a pulse signal (Pa) having a predetermined width and an oscillator (24) which oscillates and provides an output signal (Pb) as the short pulse wave (Pt) only in a period in which the pulse signal (Pa) from the pulse generator (23) is being input, the oscillator stopping oscillation in a period in which the pulse signal (Pa) is not being input.

In order to achieve the above object, according to a seventeenth aspect of the present invention, there is provided a short-range radar control method comprising:

a step of preparing a transmitter section (21) and a receiver section (30);

a step of radiating a short pulse wave (Pt) having a predetermined width into space (1) by using the transmitter section (21) each time a transmission trigger signal (Gt) is received;

a step of receiving a reception trigger signal (Gr) by using the receiver section (30), to perform reception and detection processing on a reflected wave (Pr) of the short pulse wave (Pt);

a step of generating a variable-period pulse whose frequency changes in accordance with frequency data (Df) specified from an outside, by using a direct digital synthesizer (41a) which outputs a signal having a frequency corresponding to the frequency data (Df) based on a search instruction;

a step of outputting as the transmission trigger signal (Gt) a first pulse whose level shifts in a predetermined direction at a reference timing that is assumed to be a timing at which a level of the variable-period pulse shifts first in a predetermined direction;

a step of outputting as the reception trigger signal (Gr) a second pulse whose level shifts in a predetermined direction at a timing when the level of the variable-period pulse has shifted in a direction opposite to the first predetermined direction after the reference timing;

a step of, including: the step of generating the variable-period pulse; the step of outputting the first pulse as the transmission trigger signal (Gt); and the step of outputting the second pulse as the reception trigger signal (Gr), outputting the transmission trigger signal (Gt) to the transmitter section (21) in the step of outputting the first pulse as the transmission trigger signal each time the search instruction is received in the step of generating the variable-period pulse, and also outputting to the receiver section (30) as the reception trigger signal (Gr) a signal delayed by an arbitrary lapse of time with respect to the transmission trigger signal (Gt) in order to give delay time (Tr) between transmission and reception, in the step of outputting the second pulse as the reception trigger signal;

a step of storing beforehand in a memory (53a) a relationship between the frequency data (Df) and the delay time (Tr) between transmission and reception in a form of a table of computation expressions or calculation results; and a step of varying the frequency data (Df) destined for the direct digital synthesizer (41a) for use in the step of generating the variable-period pulse based on the relationship between the frequency data (Df) and the delay time (Tr) between transmission and reception stored in the memory (53a), thereby enabling arbitrarily varying delay time of the reception trigger signal (Gr) with respect to the transmission trigger signal (Gt).

In order to achieve the above object, according to an eighteenth aspect of the present invention, there is provided a short-range radar control method according to the seventeenth aspect, wherein the step of outputting the first pulse as the transmission trigger signal (Gt) has a step of giving a delay of a fixed lapse of time to the first pulse by using a fixed delay circuit (43), and the step of outputting the second pulse as the reception trigger signal (Gr) outputs the reception trigger signal (Gr) at a timing when a lapse of time equal to an integral multiple of half a period of the variable-period pulse and longer than the fixed lapse of time has elapsed since the reference timing.

In order to achieve the above object, according to a nineteenth aspect of the present invention, there is provided a short-range radar control method according to the seventeenth aspect, wherein the step of performing the reception and detection processing comprises:

a step of receiving the reflected wave (Pr) of the short pulse wave (Pt) radiated into the space (1) by using the receiver section (30) and dividing in-phase a signal (R') of the reflected wave (Pr) into first and second signals (V1, V2);

a step of linear-multiplying the first and second signals (V1, V2) by using a linear multiplier (36) and outputting a linear-multiplied signal;

a step of extracting a baseband component from the linear-multiplied signal;

a step of performing analysis processing on an object (1a) present in the space (1) based on the baseband component; and a step of performing predetermined control on at least one of the transmitter section (21) and the receiver section (30) based on a result of the analysis processing.

In order to achieve the above object, according to a twentieth aspect of the present invention, there is provided a short-range radar control method according to the nineteenth aspect, wherein the step of outputting the linear-multiplied signal comprises:

a step of performing linear multiplication for the purpose of outputting the linear-multiplied signal by using a Gilbert mixer as the linear multiplier (36).

In order to achieve the above object, according to a twenty-first aspect of the present invention, there is provided a short-range radar control method according to the nineteenth aspect, further comprising:

a step of integrating the baseband component and holding and outputting a result of the integration before the step of performing analysis processing.

In order to achieve the above object, according to a twenty-second aspect of the present invention, there is provided a short-range radar control method according to the twenty-first aspect, wherein the step of integrating the baseband component comprises:

a step of performing variable control on a timing for starting integration of the baseband component and integration time based on a result of the analysis processing.

In order to achieve the above object, according to a twenty-third aspect of the present invention, there is provided a short-range radar control method according to the nineteenth aspect, wherein the transmitter section (21) is provided with a power amplifier (25) which amplifies the short pulse wave (Pt) and the receiver section (30) is provided with a low-noise amplifier (32) which amplifies a signal (R) of the reflected wave (Pr), and the step of performing the predetermined control comprises:

a step of controlling a gain of at least one of the power amplifier (25) provided to the transmitter section (21) and the low-noise amplifier (32) provided to the receiver section (30) such that a level of the signal (R') of the reflected wave (Pr) falls in a linear-operation range of the linear-multiplier (36) in the receiver section (30).

In order to achieve the above object, according to a twenty-fourth aspect of the present invention, there is provided a short-range radar control method according to the seventeenth aspect, wherein the step of radiating the short pulse wave (Pt) into the space (1) by using the transmitter section (21) comprises:

a step of generating a pulse signal (Pa) having a predetermined width;

a step of performing an oscillation operation only in a period in which the pulse signal (Pa) is being input, and outputting an output signal (Pb) as the short pulse wave (Pt); and a step of stopping the oscillation operation in a period in which the pulse signal (Pa) is not input, to avoid output of the output signal (Pb) as the short pulse signal (Pt).

In order to achieve the above object, according to a twenty-fifth aspect of the present invention, there is provided a short-range radar control method comprising:

a step of preparing a transmitter section (21) and a receiver section (30);

a step of radiating a short pulse wave (Pt) having a predetermined width into space (1) by using the transmitter section (21) each time a transmission trigger signal (Gt) is received;

a step of receiving a reception trigger signal (Gr) by using the receiver section (30), to perform reception and detection processing on a reflected wave (Pr) of the short pulse wave (Pt);

a step of generating a variable-period pulse whose frequency changes in accordance with frequency data (Df) specified from an outside, by using a direct digital synthesizer (41a) which outputs a signal having a frequency corresponding to the frequency data (Df) based on a search instruction;

a step of outputting a first pulse at a reference timing that is assumed to be a timing at which the variable-period pulse rises or falls;

a step of giving a delay of a fixed lapse of time to the first pulse, and outputting it as the transmission trigger signal (Gt);

a step of outputting the reception trigger signal (Gr) at a timing when a lapse of time that is equal to an integral multiple of half a period of the variable-period pulse and longer than the fixed lapse of time has elapsed since the reference timing;

a step of, including: the step of generating the variable-period pulse; the step of outputting the first pulse; the step of giving the fixed lapse of time to the first pulse and outputting it as the transmission trigger signal (Gt); and the step of outputting the reception trigger signal (Gr) at a timing when the lapse of time longer than the fixed lapse of time has elapsed, outputting the transmission trigger signal (Gt) to the transmitter section (21) in the step of giving the fixed lapse of time to the first pulse and outputting it as the transmission trigger signal each time the search instruction is received in the step of generating the variable-period pulse and also outputting to the receiver section (30) as the reception trigger signal (Gr) a signal delayed by an arbitrary lapse of time with respect to the transmission trigger signal (Gt) at a timing when the lapse of time longer than the fixed lapse of time has elapsed in order to give delay time (Tr) between transmission and reception, in the step of outputting as the reception trigger signal (Gr);

a step of storing beforehand in a memory (53a) a relationship between the frequency data (Df) and the delay time (Tr) between transmission and reception in a form of a table of computation expressions or calculation results; and a step of varying the frequency data (Df) destined for the direct digital synthesizer (41a) for use in the step of generating the variable-period pulse based on the relationship between the frequency data (Df) and the delay time (Tr) between transmission and reception stored in the memory (53a), thereby enabling arbitrarily varying delay time of the reception trigger signal (Gr) with respect to the transmission trigger signal (Gt).

In order to achieve the above object, according to a twenty-sixth aspect of the present invention, there is provided a short-range radar control method according to the twenty-fifth aspect, wherein the step of generating the first pulse outputs a first pulse whose level rises at the reference timing, and the step of outputting the reception trigger signal (Gr) at the timing when the lapse of time longer than the fixed lapse of time has elapsed outputs as the reception trigger signal (Gr) a signal whose level rises at a timing when a lapse of time equal to an integral multiple of half a period of the variable-period pulse and longer than the fixed lapse of time has elapsed since the reference timing.

In order to achieve the above object, according to a twenty-seventh aspect of the present invention, there is provided a short-range radar control method according to the twenty-fifth aspect, wherein the step of performing the reception and detection processing comprises:

a step of receiving the reflected wave (Pr) of the short pulse wave (Pt) radiated into the space (1) by using the receiver section (30) and dividing in-phase a signal (R') of the reflected wave (Pr) into first and second signals (V1, V2);

a step of linear-multiplying the first and second signals (V1, V2) by using a linear multiplier (36) and outputting a linear-multiplied signal;

a step of extracting a baseband component from the linear-multiplied signal;

a step of performing analysis processing on an object (1a) present in the space (1) based on the baseband component; and a step of performing predetermined control on at least one of the transmitter section (21) and the receiver section (30) based on a result of the analysis processing.

In order to achieve the above object, according to a twenty-eighth aspect of the present invention, there is provided a short-range radar control method according to the seventeenth aspect, wherein the step of outputting the linear-multiplied signal comprises:

a step of performing linear multiplication for the purpose of outputting the linear-multiplied signal by using a Gilbert mixer as the linear multiplier (36).

In order to achieve the above object, according to a twenty-ninth aspect of the present invention, there is provided a short-range radar control method according to the twenty-seventh aspect, further comprising:

a step of integrating the baseband component and holding and outputting a result of the integration before the step of performing the analysis processing.

In order to achieve the above object, according to a thirtieth aspect of the present invention, there is provided a short-range radar control method according to the twenty-ninth aspect, wherein the step of integrating the baseband component comprises:

a step of performing variable control on a timing for starting integration of the baseband component and integration time based on a result of the analysis processing.

In order to achieve the above object, according to a thirty-first aspect of the present invention, there is provided a short-range radar control method according to the twenty-seventh aspect, wherein the transmitter section (21) is provided with a power amplifier (25) which amplifies the short pulse wave and the receiver section (30) is provided with a low-noise amplifier (32) which amplifies a signal (R) of the reflected wave (Pr), and the step of performing the predetermined control comprises:

a step of controlling a gain of at least one of the power amplifier (25) provided to the transmitter section (21) and the low-noise amplifier (32) provided to the receiver section (30) such that a level of the signal (R') of the reflected wave (Pr) falls in a linear-operation range of the linear-multiplier (36) in the receiver section (30).

In order to achieve the above object, according to a thirty-second aspect of the present invention, there is provided a short-range radar control method according to the twenty-fifth aspect, wherein the step of radiating the short pulse wave (Pt) into the space (1) by using the transmitter section (21) comprises:

a step of generating a pulse signal (Pa) having a predetermined width;

a step of performing an oscillation operation only in a period in which the pulse signal (Pa) is being input, and outputting an output signal (Pb) as the short pulse wave (Pt); and a step of stopping the oscillation operation in a period in which the pulse signal (Pa) is not input, to avoid output of the output signal (Pb) as the short pulse signal (Pt).

In such a manner, in a configuration according to a short-range radar of the present invention and a method of controlling the same, a timing at which a variable-period pulse output from a variable-period pulse generator including a direct digital synthesizer (DDS) has shifted in level first since reception of a search instruction is used as a reference timing, so that a signal that shifts in level at the reference timing or a fixed lapse of time later than the reference timing is generated and output as a transmission trigger signal, a signal that shifts in level at a timing delayed by half a period of the variable-period pulse or its integral multiple from a timing at which the transmission trigger signal is output is generated and output as a reception trigger signal, and frequency data of the DDS is changed based on a relationship between the frequency data and delay time between transmission and reception stored in a memory, to enable varying delay time between the transmission trigger signal and the reception trigger signal.

Therefore, according to a short-range radar of the present invention and a method of controlling the same, it is possible to arbitrarily change delay time between transmission and reception at a high time resolution by using a simple configuration and low power dissipation.

BRIEF DESCRIPTION OF DRAWINGS

FIG. 4 is a circuit diagram showing a basic type of a Gilbert mixer employed as one example of a linear multiplier in a detector circuit for use in a receiver section of the short-range radar according to the first embodiment shown in FIG. 1.

FIG. 5 is an explanation diagram of an operation of the Gilbert mixer shown in FIG. 4, showing a sine-wave signal S(t) which is input in-phase in a burst to the Gilbert mixer and a square wave $S(t)^2$ which is output from the Gilbert mixer.

FIG. 6 is a diagram showing a principle configuration of a sample-and-hold circuit for use in the receiver section of the short-range radar according to the first embodiment shown in FIG. 1.

FIG. 7 is a block diagram showing a specific configuration of a trigger signal generating section of the short-range radar according to the first embodiment shown in FIG. 1.

FIG. 11 is one example of a table showing a relationship among frequency data Df, a frequency fd and a period Td of a variable-period pulse, and delay time Tr between transmission and reception, the frequency data Df being supplied to the direct digital synthesizer in the trigger signal generating section shown in FIG. 7.

BEST MODE FOR CARRYING OUT THE INVENTION

The following will describe several embodiments of a short-range radar according to the present invention with reference to the accompanying drawings.

First Embodiment

First, a configuration of a short-range radar according to a first embodiment of the present invention will be described.

Figure 1:
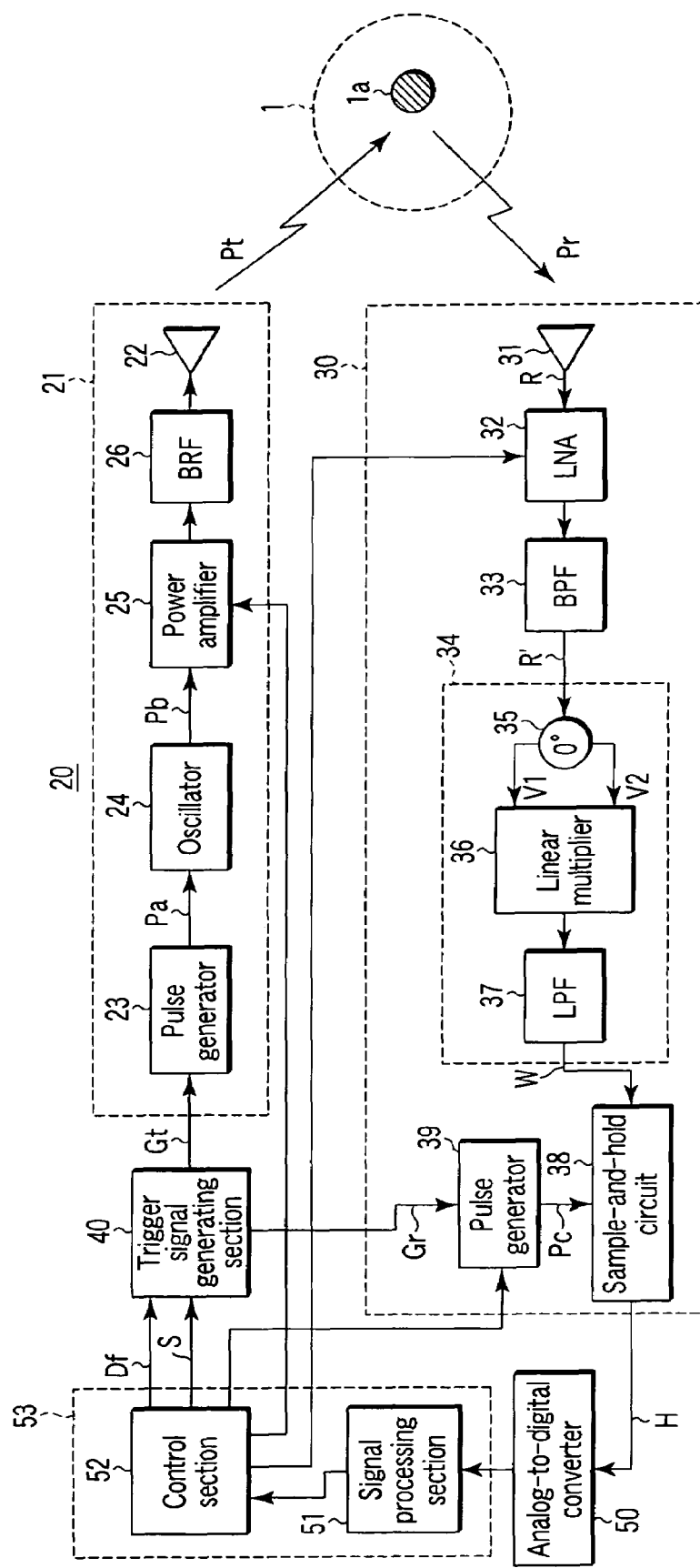
FIG. 1 is a block diagram showing a system configuration of a short-range radar according to a first embodiment of the present invention.

FIG. 1 is a block diagram showing a configuration of a short-range radar 20 according to the first embodiment of the invention.

Specifically, the short-range radar 20 shown in FIG. 1 comprises a transmitter section 21, a receiver section 30, a trigger signal generating section 40, an analog-to-digital converter (ADC) 50, a signal processing section 51, and a control section 52.

Each time receiving a trigger signal Gt output in a predetermined period Tg from the trigger signal generating section 40, the transmitter section 21 radiates via a transmission antenna 22 into space 1 a short pulse wave Pt having a predetermined carrier frequency Fc (e.g., 26 GHz) and a predetermined width Tp (e.g., 1 ns) generated as described later.

It is to be noted that the transmission antenna 22 is in some cases used together with a reception antenna 31 in the receiver section 30 described later.

As shown in FIG. 1, the transmitter section 21 has: a pulse generator 23 for generating a pulse signal Pa having the width Tp in synchronization with a timing at which a level of the transmission trigger signal Gt from the trigger signal generating section 40 shifts in a predetermined direction (e.g., rise direction); an oscillator 24 for oscillating and outputting a signal having the carrier frequency Fc only in the period Tp during which it receives the pulse signal Pa from the pulse generator 23; a power amplifier 25 for amplifying an output signal from the oscillator 24 and supplying it to the transmission antenna 22; and a band rejection filter (BRF) 26 for suppressing the output signal from the power amplifier 25 from giving out-of-band necessary radiation.

Figure 2:
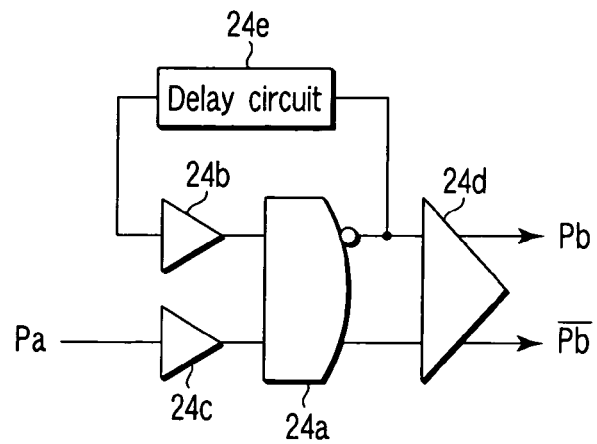
FIG. 2 is a block diagram showing one example of an oscillator for use in a transmitter section of the short-range radar according to the first embodiment shown in FIG. 1.

FIG. 2 is a block diagram showing one configuration example of the oscillator 24 for use in the transmitter section 21 of the short-range radar according to the first embodiment shown in FIG. 1.

That is, as shown in FIG. 2, the oscillator 24 has: a two-input; two-output type gate circuit 24a in which an AND circuit and a NAND circuit having common inputs are integrated; first and second input buffers 24b and 24c of emitter-follower type which are connected to inputs of the gate circuit 24a, respectively; an output buffer 24d connected to an output of the gate circuit 24a; and a delay circuit 24e for delaying an inverted output of the gate electrode 24a by a predetermined delay lapse of time and inputting it to the first input buffer 24b.

The oscillator 24 is integrated into one chip by a microwave monolithic integrated circuit (MMIC).

It is to be noted that the delay circuit 24e is constituted of, for example, strip lines.

Figure 3:
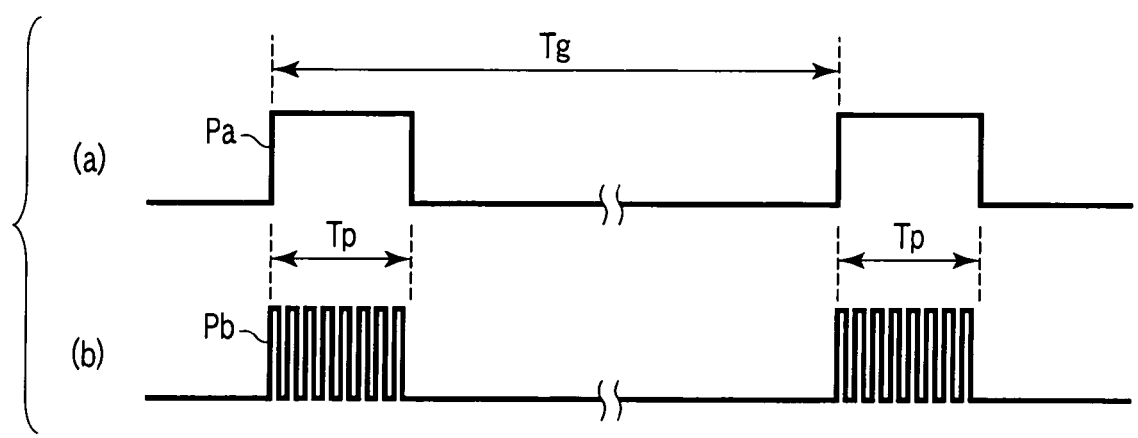
FIG. 3 is an explanation diagram of an operation of the oscillator shown in FIG. 2, showing a pulse signal Pa having a period Tg which is input to the oscillator and a rectangular-wave signal Pb which is output in a burst from the oscillator.

While the pulse signal Pa having the period Tg is being input to the input buffer 24c from the oscillator 24 having such a configuration as shown in FIG. 3A, a rectangular-wave output signal Pb having a predetermined frequency (carrier frequency) is oscillated and output in a burst as shown in FIG. 3B.

The frequency of the output signal Pb from the oscillator 24 is determined by a sum total of delay time between input and output through the input buffer 24b and the gate circuit 24a and delay time due to the delay circuit 24e.

The delay time between input and output through the input buffer 24b and the gate circuit 24a is a fixed value generally determined depending on elements of the circuits.

Therefore, by configuring the delay circuit 24a so that some of its constants can be changed and adjusting these constants, an oscillation frequency of the output signal Pb of the oscillator 24 is set to approximately a center frequency (e.g., 26 GHz) of the above-described UWB.

Since the transmitter section 21 is configured to control an oscillation operation itself of the oscillator 24 by using the pulse signal Pa as described above, no carrier leakage occurs in principle.

Therefore, a restriction on a power density prescribed in use of the UWB needs to be taken into account only in terms of instantaneous power of a short pulse wave output upon oscillation, so that prescribed power can be used efficiently at the maximum.

It is to be noted that the above-described configuration of the oscillator 24 shown in FIG. 2 is just one example, and any other circuit configuration may be accepted.

In such a case also, by opening and closing a feedback loop for oscillation by using the pulse signal Pa or turning on/off power (current power, etc.) of the oscillation circuit by using the pulse signal Pa, the above-described burst wave free of carrier leakage can be obtained.

The signal Pb output from the oscillator 24 as described above is amplified by the power amplifier 25 and then supplied via the BRF 26 to the transmission antenna 22 as a short pulse wave having the predetermined carrier frequency Fc (e.g., 26 GHz).

In such a manner, the above-described short pulse wave Pt is radiated from the transmission antenna 22 into the space 1 subject to search.

It is to be noted that a gain of the power amplifier 25 can be variably controlled by the control section 52.

On the other hand, the receiver section 30 receives a reflected wave Pr from an object 1a in the space 1 via the reception antenna 31, amplifies a signal R of the reflected wave Pr by using a low-noise amplifier (LNA) 32, and detects by using a detector circuit 34 a signal R' of the reflected wave Pr that is limited in bandwidth by a bandpass filter (BPF) 33 having a bandwidth of about 2 GHz.

It is to be noted that a gain of the LNA 32 can be variably controlled by the control section 52.

The detector circuit 34 is comprised of: a branch circuit 35 for dividing in-phase (with a phase difference of zero) the signal R' of the reflected wave Pr output from the BPF 33 into a first signal V1 and a second signal V2; a linear multiplier 36 for linear-multiplying these signals divided into two branches in-phase, that is, the first signal V1 and the second signal V2; and a low-pass filter (LPF) 37 for extracting a baseband component W from an output signal of the linear multiplier 36.

The linear multiplier 36, although it has many concepts such as a concept of using a double-balanced mixer, may be considered to be configured by using a Gilbert mixer as something that operates at high speed.

As shown in FIG. 4, the Gilbert mixer is basically comprised of first to third differential amplifiers 36a, 36b, and 36c.

In this configuration, the first signal V1 is differentially input to the first differential amplifier 36a, and the second signal V2 is differentially input to the second and third differential amplifiers 36b and 36c connected to a load side of the first differential amplifier 36a. Thereby, only a negative-phase component of a linear-multiplied signal, $-(V1 \times V2)$ and a positive-phase component of the linear-multiplied signal, $(V1 \times V2)$, whose absolute values are each equal to a product of the first and second signals V1 and V2, are output from common-load resistors R3 and R4 of the second and third differential amplifiers 36b and 36c, respectively.

Specifically, in the Gilbert mixer, the first differential amplifier 36a comprises first and second transistors Q1 and Q2 that have respective base input terminals and collector output terminals and a common emitter current path. The base input terminals of the respective first and second transistors Q1 and Q2 are connected to a first signal source V1, and the common emitter current path is connected to a ground line via a constant current source I1 and a first bias power source Vb1 which are connected in series.

It is to be noted that the common emitter current path of the first and second transistors Q1 and Q2 comes out from a node between emitter resistors R1 and R2, while the base input terminal of the first transistor Q1 is connected via a second bias power source Vb2 to the ground line.

The second differential amplifier 36b, on the other hand, comprises third and fourth transistors Q3 and Q4 that have respective base input terminals and collector output terminals and a common emitter current path. The base input terminals of the respective third and fourth transistors Q3 and Q4 are connected to a second signal source V2, and the common emitter current path of the third and fourth transistors Q3 and Q4 is connected to the collector output terminal of the first transistor Q1 in the first differential amplifier 36a.

In addition, the third differential amplifier 36c comprises fifth and sixth transistors Q5 and Q6 that have respective base input terminals and collector output terminals and a common emitter current path. The base input terminals of the respective fifth and sixth transistors Q5 and Q6 are connected to the second signal source V2, and the common emitter current path of the fifth and sixth transistors Q5 and Q6 is connected to the collector output terminal of the second transistor Q2 in the first differential amplifier 36a.

It is to be noted that the base input terminal of the fourth transistor Q4 in the second differential amplifier 36b and the base input terminal of the fifth transistor Q5 in the third differential amplifier 36c are connected to each other and also connected to the ground line via a third bias power source Vb3.

Further, the collector output terminal of the third transistor Q3 in the second differential amplifier 36b and the collector output terminal of the fifth transistor Q5 in the third differential amplifier 36c are commonly connected to the ground line via the load resistor R3 and also connected to a first output terminal OUT1.

Furthermore, the collector output terminal of the fourth transistor Q4 in the second differential amplifier 36b and the collector output terminal of the sixth transistor Q6 in the third differential amplifier 36c are commonly connected to the ground line via the load resistor R4 and also connected to a second output terminal OUT2.

It is thus possible to derive at least one of a linear-multiplied outputs, $-(V1 \times V2)$ and $(V1 \times V2)$, of the first and second signals V1 and V2 from the first or second output terminal OUT1 or OUT2, respectively.

When a sine-wave signal S(t) as shown in FIG. 5A, for example, is input in-phase in a burst as the first and second signals V1 and V2 to the linear multiplier 36 by use of the Gilbert mixer having such a configuration, its output signal becomes a wave $(S(t)^2)$ obtained by squaring the input signal S(t) and its envelope (base band) W is proportional to power of the input signal S(t).

The linear multiplier 36 by use of the Gilbert mixer comprised of the plurality of differential amplifiers for use in the detector circuit 34 in such a manner can be configured to be very small by using a microwave monolithic IC (MMIC), and moreover, need not be supplied with a local signal in contract to a conventional orthogonal detector circuit, thereby requiring less power dissipation.

Then, the base band signal W obtained by the detector circuit 34 as described above is input to a sample-and-hold circuit 38.

As shown in FIG. 6 illustrating its principle, the sample-and-hold circuit 38 has a configuration such that the baseband signal W is input via a switch 38c to an integration circuit comprised of a resistor 38a and a capacitor 38b.

During a lapse of time when a pulse signal Pc from a pulse generator 39 is held at a high level (which may be a low level), the switch 38c is closed to integrate the baseband signal W, and when the pulse signal Pc is turned to the low level, the switch 38c is opened to hold a result of the integration by using the capacitor 38b.

It is to be noted that each time receiving a reception trigger signal Gr output from the trigger signal generating section 40, the pulse generator 39 generates a pulse signal Pc having a predetermined width Tc and outputs the pulse signal Pc to the sample-and-hold circuit 38.

Therefore, the receiver section 30 performs detection processing on the reflected wave Pr received from a moment of reception of the reception trigger signal Gr to a moment at which the predetermined lapse of time Tc has elapsed.

The width Tc of the pulse signal Pc from the pulse generator 39 can be changed by the control section 52.

A signal H integrated and held by the sample-and-hold circuit 38 is converted into a digital value by the analog-to-digital converter 50 immediately after it is held, and the converted signal is input to the signal processing section 51.

The signal processing section 51 analyzes the object 1a present in the space 1 based on the signal H obtained by the receiver section 30, posts a result of the analysis by using an unillustrated output device (e.g., display or sound generator), and notifies the control section 52 of information necessary for control.

The control section 52 provides various control items on at least one of the transmitter section 21 and the receiver section 30 according to a schedule program predetermined on the short-range radar 20 or in response to a result of processing by the signal processing section 51.

Further, the control section 52 provides the trigger signal generating section 40 with a search instructing signal (search instruction) S and information that determines delay time Tr corresponding to a search distance region (frequency data Df described later), thereby causing the short-range radar 20 to search a desired distance region.

Having received the search instructing signal S and the frequency data Df corresponding to the delay time Tr between transmission and reception from the control section 52, the trigger signal generating section 40 outputs the transmission trigger signal Gt to the pulse generator 23 in the transmitter section 21. In addition, when the delay time Tr elapses since the output of the transmission trigger signal Gt, the trigger signal generating section 40 outputs the reception trigger signal Gr to the pulse generator 39 in the receiver section 30.

As shown in FIG. 7, the trigger signal generating section 40 has a variable-period pulse generator 41, a first pulse generation circuit 42, a fixed delay circuit 43, and a second pulse generation circuit 44.

The variable-period pulse generator 41 is comprised of a direct digital synthesizer (DDS) 41a, a low-pass filter (LPF) 41b, a waveform shaping circuit 41c, and a clock signal generator 41d.

The DDS 41a is supplied with a clock signal C having a predetermined frequency fs (e.g., 200 MHz) from the internal clock signal generator 41d and frequency data Df having a predetermined number of bits L (e.g., L=32) corresponding to the delay time Tr from the control section 52.

Having received the clock signal C and the frequency data Df, the DDS 41a serially reads waveform data by performing address specification by use of a value obtained by integrating the frequency data Df in a period of the clock signal C, on an internal ROM with an address length L that previously stores the waveform data as much as one period of a sine wave.

Then, the DDS 41a converts the waveform data serially read from the internal ROM into an analog signal by using an internal digital-to-analog converter (DAC). Thereafter, the DDS 41a outputs to the LPF 41b a sine-wave signal (which strictly has a waveform that changes step-wise along a sine wave) having a frequency fd which is determined by the frequency fs of the clock signal C, the address length L, and the frequency data Df.

The LPF 41b removes a high-frequency component (e.g., component of 71 MHz or higher) of the DAC-converted output from the DDS 41a to thereby generate a sine-wave signal and output the generated sine-wave signal to the waveform shaping circuit 41c.

Figure 8:
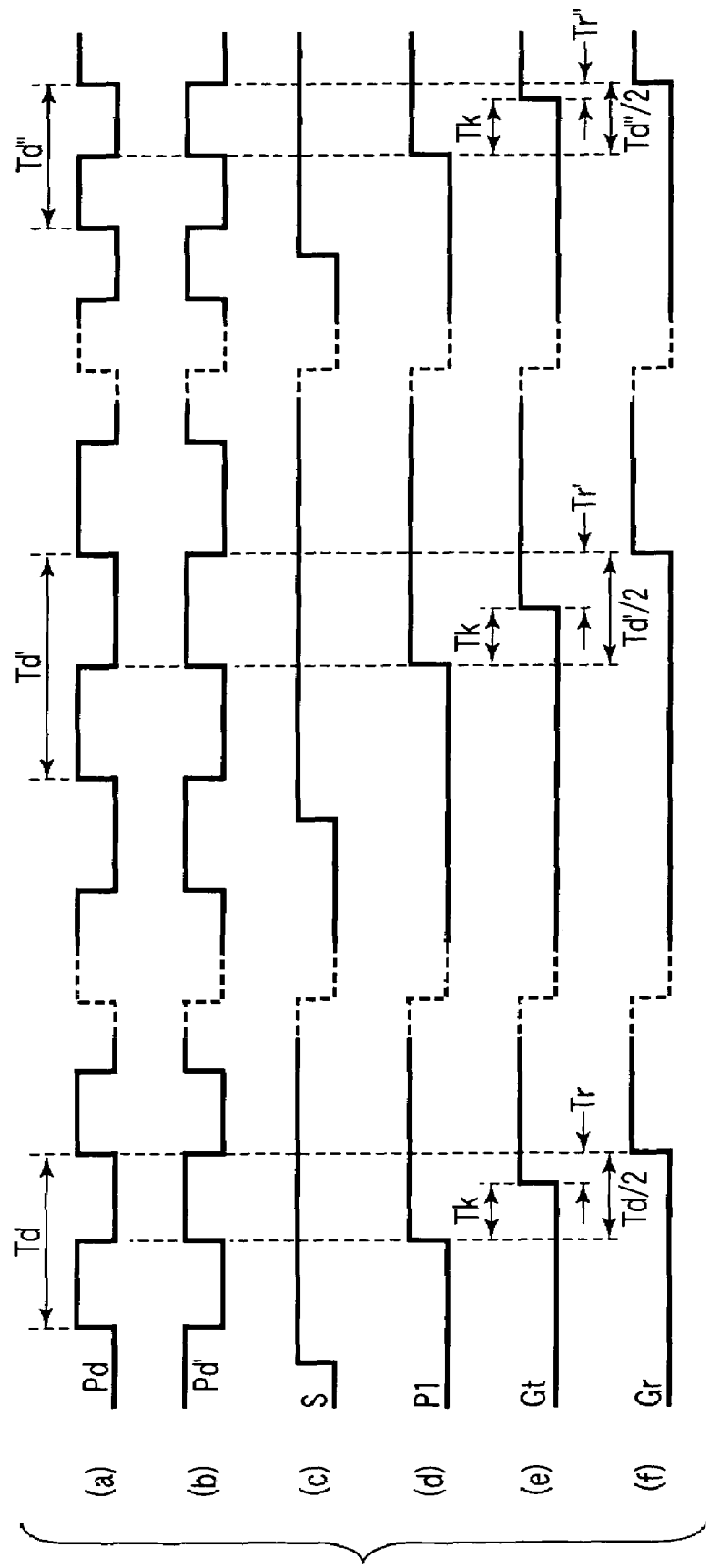
FIG. 8 is an explanatory timing chart of an operation of the trigger signal generating section shown in FIG. 7.

The waveform shaping circuit 41c performs waveform shaping processing on the sine-wave signal, and outputs two-phase variable-period pulses Pd and Pd' having a duty ratio 50, mutually opposite levels, and the frequency fd (period Td) as shown in (a) and (b) of FIG. 8.

Although the present embodiment is described with reference to a case where the variable-period pulse generator 41 outputs the two-phase variable-period pulses Pd and Pd', it may be configured to output a single-phase variable-period pulse Pd or Pd'.

Further, the above-described DDS 41a has a built-in digital-to-analog converter. However, some commercially available DDSs may not contain a digital-to-analog converter and others may contain it as well as the LPF 41b and the waveform shaping circuit 41c, either DDS type of which can be used in the present invention.

The frequency fd of the variable-period pulses Pd and Pd' is given as follows in a range of ½ or less of the clock signal frequency fs:

$$fd = Df \cdot fs/2^L,$$

so that the period Td is given as follows in a range of at least twice the period Ts of the clock signal frequency fs:

$$Td = Ts \cdot 2^L/Df$$

Herein, a variation $\Delta T$ (time resolution) of the period Td when a value of the frequency data Df has changed from A to A+1 can be expressed as follows:

$$\Delta T = (Ts \cdot 2^L)\{(1/A) - [1/(A+1)]\}$$
$$= (Ts \cdot 2^L)\{1/[1(A+1)]\}$$

If A is sufficiently larger than 1 in this equation, the following is given:

$$\Delta T = (Ts \cdot 2^L)(1/A^2)$$

If, for example, Ts=5 ns, $2^L=2^{32}$, approximately, $4 \times 10^9$, and $A=1 \times 10^6$, the following is given:

$$\Delta T = 20/(1 \times 10^{12}) = 0.02 \text{ (ns)}$$

That is, the time resolution when the frequency data Df is in the vicinity of $1 \times 10^6$ becomes 0.02 ns. If $A=10 \times 10^6$, it becomes 0.2 ps, which means it is possible to obtain a time resolution sufficiently smaller than a short pulse width (1 ns) in these data setting ranges, thereby changing the period almost continuously.

These variable-period pulses Pd and Pd' are output to the first pulse generation circuit 42 and the second pulse generation circuit 44.

The first pulse generation circuit 42 is configured by flip-flop circuits that receive the variable-period pulses Pd and Pd'.

In the first pulse generation circuit 42, a timing at which a level of the variable-period pulse Pd shifts first in a predetermined direction (e.g., rise direction) since the search instructing signal S is input is used as a reference timing as shown in (c) of FIG. 8.

Accordingly, the first pulse generation circuit 42 generates a first pulse P1 whose level shifts in a predetermined direction (e.g., rise direction) in synchronization with the reference timing (timing at which the other variable-period pulse Pd' rises) as shown in (d) of FIG. 8, and outputs the first pulse P1 to the fixed delay circuit 43.

The fixed delay circuit 43 is configured by, for example, delay lines, and when fixed delay time Tk (e.g., 7 ns) is given to the first pulse P1 as shown in (e) of FIG. 8, the fixed delay circuit 43 outputs the first pulse P1 to which this fixed delay time Tk is given, to the transmitter section 21 as the transmission trigger signal Gt.

The second pulse generation circuit 44 is configured by a flip-flop circuit, etc., for receiving the variable-period pulse Pd, and outputs as the reception trigger signal Gr a pulse whose level shifts in a predetermined direction (e.g., rise direction) at a timing when a lapse of time N·Td/2 which is equal to an integral multiple N of half the period Td of the variable-period pulse and larger than the above-described fixed delay time Tk has elapsed since the reference timing at which the first pulse P1 rises in level as shown in (f) of FIG. 8.

It is to be noted that FIG. 8 shows an example where N=1.

Accordingly, a different Tr in time between a rise timing of the transmission trigger signal Gt and a rise timing of the reception trigger signal Gr is as follows:

$$Tr = (N \cdot Td/2) - Tk$$

Therefore, if the period of the variable-period pulses Pd and Pd' is increased as Td' as shown at a midsection of FIG. 8, the time difference can be increased as Tr'.

Conversely, if the period is decreased as Td" as shown at the right end of FIG. 8, the time difference can also be decreased as Tr".

Figure 9:
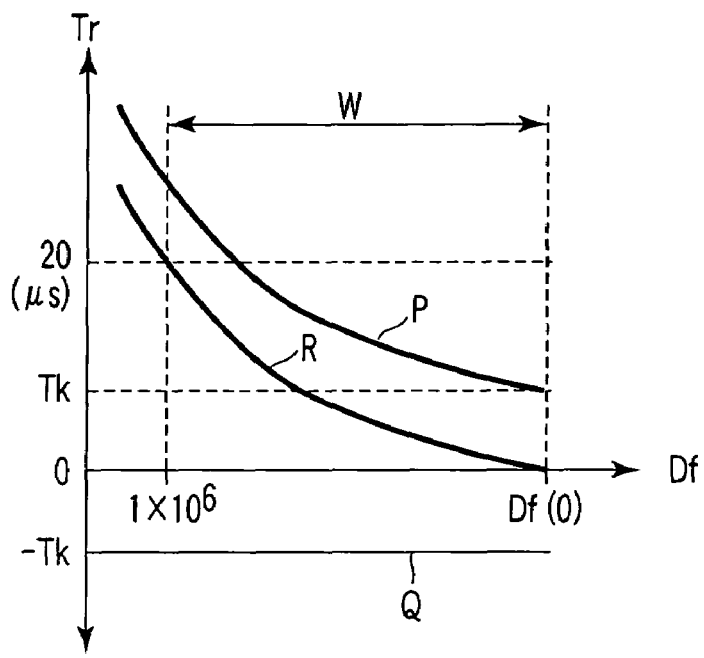
FIG. 9 is a graph showing a relationship between frequency data and delay time between transmission and reception, the frequency data being supplied to a direct digital synthesizer in the trigger signal generating section shown in FIG. 7.
Figure 10:
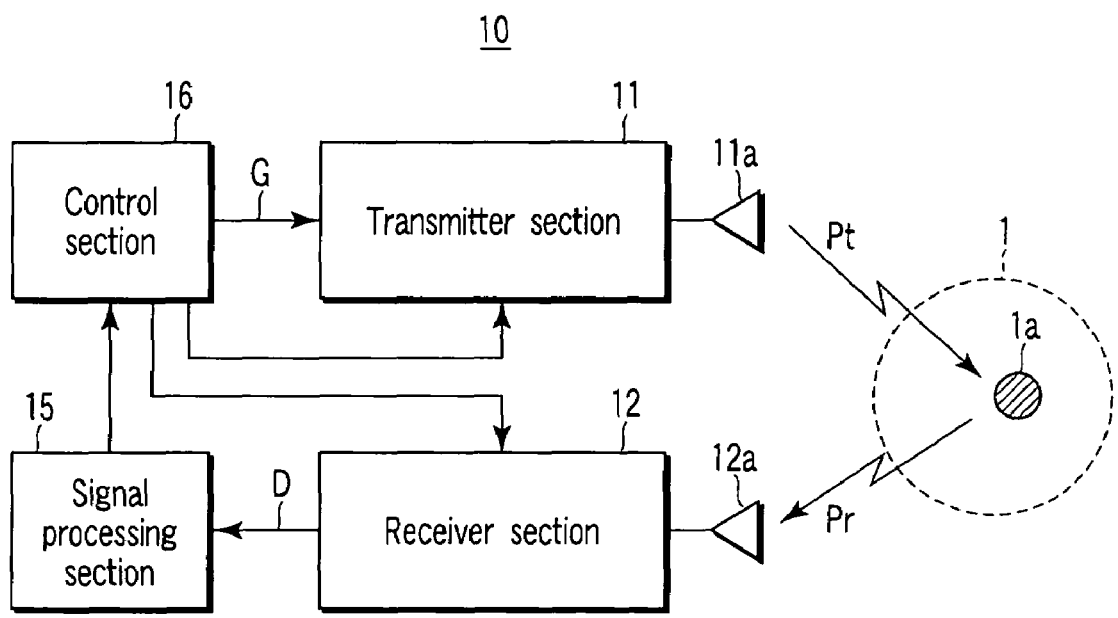
FIG. 10 is a block diagram showing a basic configuration of a conventional pulse radar.

FIG. 9 is a graph of a curve showing a relationship between the frequency data Df and the time difference Tr in a case where N=1.

The curve P in FIG. 9 represents a first term Td/2 in the right-hand side member of the above equation in a case where N=1, which may be expressed as follows by using the frequency data Df:

$$P = Td/2 = Ts \cdot 2^{L-1}/Df$$

Further, a value of the fixed delay is expressed by a straight line of Q=−Tk, so that a curve R that represents a sum (P+Q) of both of these gives a variation characteristic of a final time different Tr.

In FIG. 9, the time different Tr represented by the curve R becomes 0 at frequency data Df(0) where P=Tk and monotonously increases as the frequency data Df comes close to 0.

If the fixed delay time Tk is supposed to be 7 ns as described above, a frequency fd at which P=Tk becomes about 71 MHz, which corresponds to a cut-off frequency of the LPF 41b.

Frequency data Df(0) that gives this frequency fd is as follows:

$$Df(0) = (10/7) \times 10^9$$

Further, in FIG. 9, as described above in a range where the frequency data Df is larger than $1 \times 10^6$, a time variation for each point of frequency data is such a small value of 0.02 ns or less so that time variation can be considered to be roughly continuous.

Further, in FIG. 9, a period Td when the frequency data Df is $1 \times 10^6$ is about 20 µs.

Therefore, as shown in FIG. 9, in a range W of $(10/7) \times 10^9$ to $1 \times 10^6$ of the frequency data Df, a time difference Tr can be changed roughly continuously in a range of 0 to 20 µs.

It is to be noted that a relationship between the frequency Df and the delay time Tr between transmission and reception is supposed to be stored beforehand in a shape of a table of computation expressions or calculation results in a memory 53a in a frequency data varying section 53 as shown in FIG. 7 (which may be the control section 52 or the signal processing section 51 of FIG. 1).

That is, the frequency data varying section 53 (or the control section 52 or the signal processing section 51) obtains frequency data Df from delay time Tr that corresponds to a search-required distance region and provides the frequency data Df to the DDS 41a in the variable-period generator 41.

FIG. 11 is one example of a table showing a relationship between frequency data Df, a frequency fd and a period Td of a variable-period pulse, and delay time Tr between transmission and reception, the frequency data Df being supplied to the DDS 41a in the variable-period pulse generator 41 shown in FIG. 7.

That is, when the delay time Tr between transmission and reception is specified, the frequency data Df is finally obtained based on the above-described relational expressions of Tr=(Td/2)−Tk, Td=1/fd, and fd=Df·fs/$2^L$ and L=32, N=1, fs=200 MHz, and Tk=7 ns.

In FIG. 11, examples are given in which Tr is 0 ns, 9.982 ns, 10 μs, and 10.01 ns, respectively.

In these cases, Td becomes 13.9 ns, 33.96 ns, 20 μs, and 34.02 ns, respectively.

Further, fd becomes 71.875 MHz, 29.443 MHz, 60.35 KHz, and 29.395 MHz, respectively.

In addition, Df becomes about $1.54 \times 10^9$, $6.32 \times 10^8$, $1.08 \times 10^6$, and $6.31 \times 10^8$, respectively.

Figure 12:
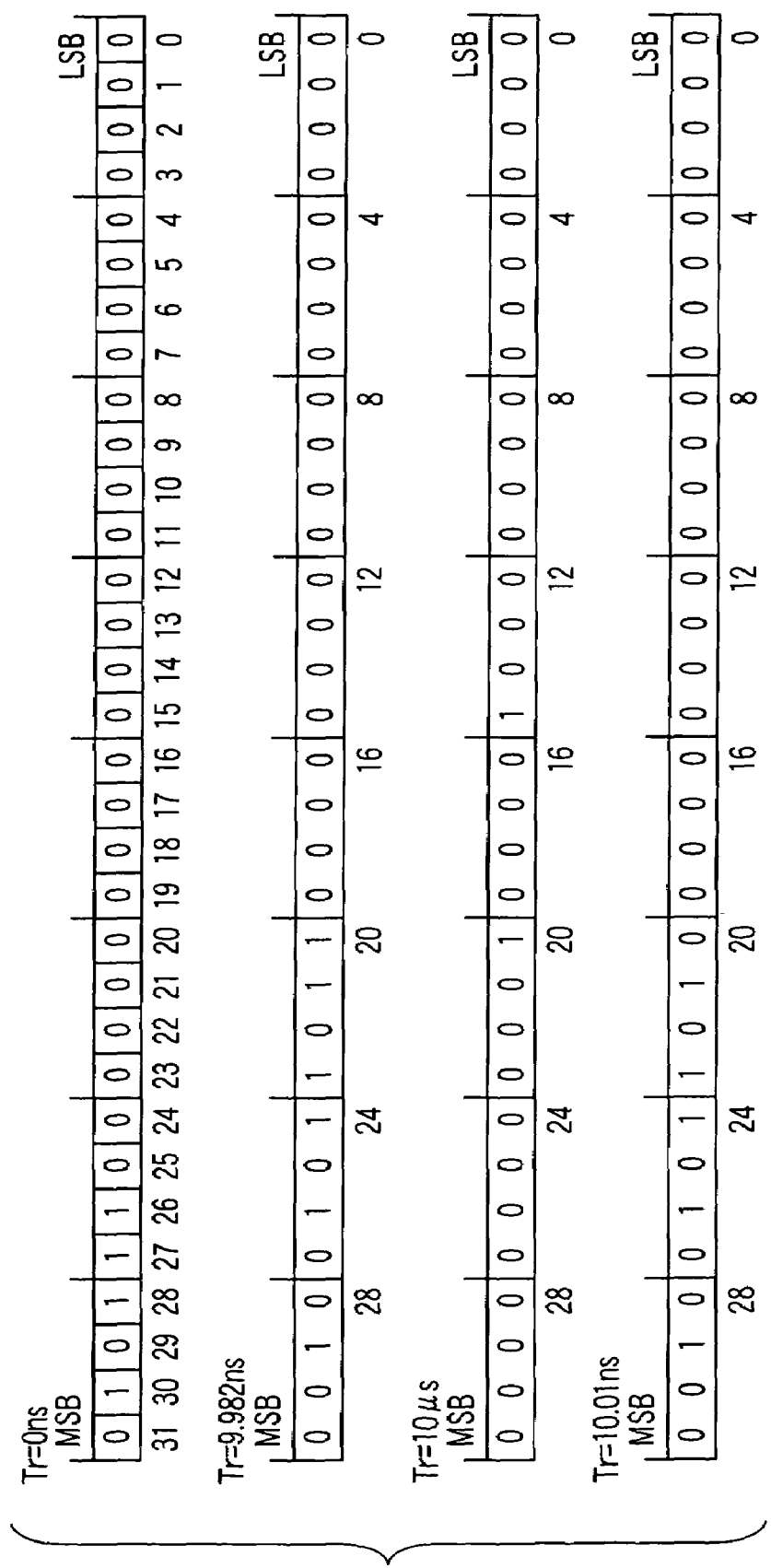
FIG. 12 is binary representation of frequency data Df with respect to delay time Tr between transmission and reception, the frequency data Df being supplied to the direct digital synthesizer in the trigger signal generating section shown in FIG. 7.

FIG. 12 is binary representation of frequency data Df actually supplied to the DDS 41a in a case where the frequency data Df in the example of FIG. 11 is $1.54 \times 10^9$, $6.32 \times 10^8$, $1.08 \times 10^6$, and $6.31 \times 10^8$, respectively.

That is, when Tr=0 ns, the binary representation of the frequency data Df ($1.54 \times 10^9$) actually supplied to the DDS 41a may be given in 32 bits of 0 to 31 as 01011100, . . . , 0 from the MSB to the LSB.

Similarly, when Tr=9.982 ns, the binary representation of the frequency data Df ($1.54 \times 10^9$) actually supplied to the DDS 41a may be given in 32 bits of 0 to 31 as 0010010110110, . . . , 0 from the MSB to the LSB.

Similarly, when Tr=10 μs, the binary representation of the frequency data Df ($1.54 \times 10^9$) actually supplied to the DDS 41a may be given in 32 bits of 0 to 31 as 00000000001000010, . . . , 0 from the MSB to the LSB.

Similarly, when Tr=10.01 ns, the binary representation of the frequency data Df ($1.54 \times 10^9$) actually supplied to the DDS 41a may be given in 32 bits of 0 to 31 as 00100101010, . . . , 0 from the MSB to the LSB.

Having received the clock signal C and the frequency data Df as described above, the DDS 41a in the variable-period pulse generator 41 serially reads waveform data by performing address specification by use of a value obtained by integrating the frequency data Df in a period of the clock signal C, on the internal ROM with the address length L in which waveform data as much as one period of the sine wave is stored beforehand.

Since a frequency of a signal output from the DDS 41a in the variable-period pulse generator 41 is extremely stable and only the single fixed delay circuit 43 is used, the time difference Tr obtained by the above-described trigger signal generating section 40 shown in FIG. 7 has an extremely high accuracy.

Therefore, a short-range radar equipped with the trigger signal generating section 40 as shown in FIG. 7 has an extremely high distance resolution, thereby enabling contributing to realization of a short-range radar that uses a stable UWB.

The short-range radar 20 according to the present invention combining the above-described configurations of FIGS. 1 and 7 basically comprises:

a transmitter section 21 which radiates a short pulse wave (Pt) having a predetermined width into space 1 each time of receiving a transmission trigger signal Gr;

a receiver section 30 which performs reception and detection processing on a reflected wave Pr of the short pulse wave Pt when having received a reception trigger signal Gr;

a variable-period pulse generator 41 including a direct digital synthesizer 41a which outputs, based on a search instruction, a signal having a frequency corresponding to the frequency data Df specified from an outside, the variable-period pulse generator generating a variable-period pulse whose period changes in accordance with the frequency data Df;

a first pulse generation circuit 42 which receives the variable-period pulse generated by the variable-period pulse generator 41, and which outputs a first pulse at a reference timing that is assumed to be a timing at which the variable-period pulse rises or falls;

a fixed delay circuit 43 which gives a delay of a fixed lapse of time to the first pulse from the first pulse generation circuit 42, and which output it as the transmission trigger signal Gt;

a second pulse generation circuit 44 which receives the variable-period pulse generated by the variable-period pulse generator 41, and which outputs the reception trigger signal Gr at a timing when a lapse of time that is equal to an integral multiple of half a period of the variable-period pulse and larger than the fixed lapse of time has elapsed since the reference timing;

a trigger signal generating section 40 including the variable-period pulse generator 41, the first pulse generation circuit 42, the fixed delay circuit 43, and the second pulse generation circuit 44, the trigger signal generating section outputting the transmission trigger signal Gt from the fixed delay circuit 43 to the transmitter section 21 each time the variable-period pulse generator 41 receives the search instruction and also outputting from the second pulse generation circuit 44 to the receiver section 30 as the reception trigger signal Gr a signal that is delayed by an arbitrary lapse of time with respect to the transmission trigger signal Gt in order to give delay time Tr between transmission and reception; and a frequency data varying section 53 including a memory 53a in which a relationship between the frequency data Df and the delay time Tr between transmission and reception is stored beforehand in a form of a table of computation expressions or calculation results, the frequency data varying section varying the frequency data Df destined for the direct digital synthesizer 41a in the variable-period pulse generator 41 based on the relationship between the frequency data Df and the delay time Tr between transmission and reception stored in the memory 53a, thereby enabling arbitrarily varying delay time of the reception trigger signal Gr with respect to the transmission trigger signal Gt.

A method for controlling the short-range radar 20 according to the present invention combining the above-described configurations of FIGS. 1 and 7 basically comprises:

a step of preparing a transmitter section 21 and a receiver section 30;

a step of radiating a short pulse wave Pt having a predetermined width into space 1 by using the transmitter section 21 each time a transmission trigger signal Gt is received;

a step of receiving a reception trigger signal Gr by using the receiver section 30, to perform reception and detection processing on a reflected wave Pr of the short pulse wave Pt;

a step of generating a variable-period pulse whose frequency changes in accordance with the frequency data by using the direct digital synthesizer 41a which outputs a signal having a frequency corresponding to frequency data Df specified from an outside based on a search instruction;

a step of outputting a first pulse at a reference timing that is assumed to be a timing at which the variable-period pulse rises or falls;

a step of giving a delay of a fixed lapse of time to the first pulse, and outputting it as the transmission trigger signal Gt;

a step of outputting the reception trigger signal Gr at a timing when a lapse of time that is equal to an integral multiple of half a period of the variable-period pulse and larger than the fixed lapse of time has elapsed since the reference timing;

a step of, including: the step of generating the variable-period pulse; the step of outputting the first pulse; the step of giving the fixed lapse of time to the first pulse and outputting it as the transmission trigger signal Gt; and the step of outputting the reception trigger signal Gr at a timing when a lapse of time longer than the fixed lapse of time has elapsed, outputting the transmission trigger signal Gt to the transmitter section 21 in the step of giving the fixed lapse of time to the first pulse and outputting it as the transmission trigger signal Gt each time receiving the search instruction in the step of generating the variable-period pulse and also outputting to the receiver section 30 as the reception trigger signal Gr a signal delayed by an arbitrary lapse of time with respect to the transmission trigger signal Gt at a timing when a lapse of time larger than the fixed lapse of time has elapsed in order to give delay time Tr between transmission and reception, in the step of outputting as the reception trigger signal Gr;

a step of storing beforehand in a memory 53a a relationship between the frequency data Df and the delay time Tr between transmission and reception in a form of a table of computation expressions or calculation results; and a step of varying the frequency data Df destined for the direct digital synthesizer 41a for use in the step of generating the variable-period pulse based on the relationship between the frequency data Df and the delay time Tr between transmission and reception stored in the memory 53a, thereby enabling arbitrarily varying delay time of the reception trigger signal Gr with respect to the transmission trigger signal Gt.

Second Embodiment

Figure 13:
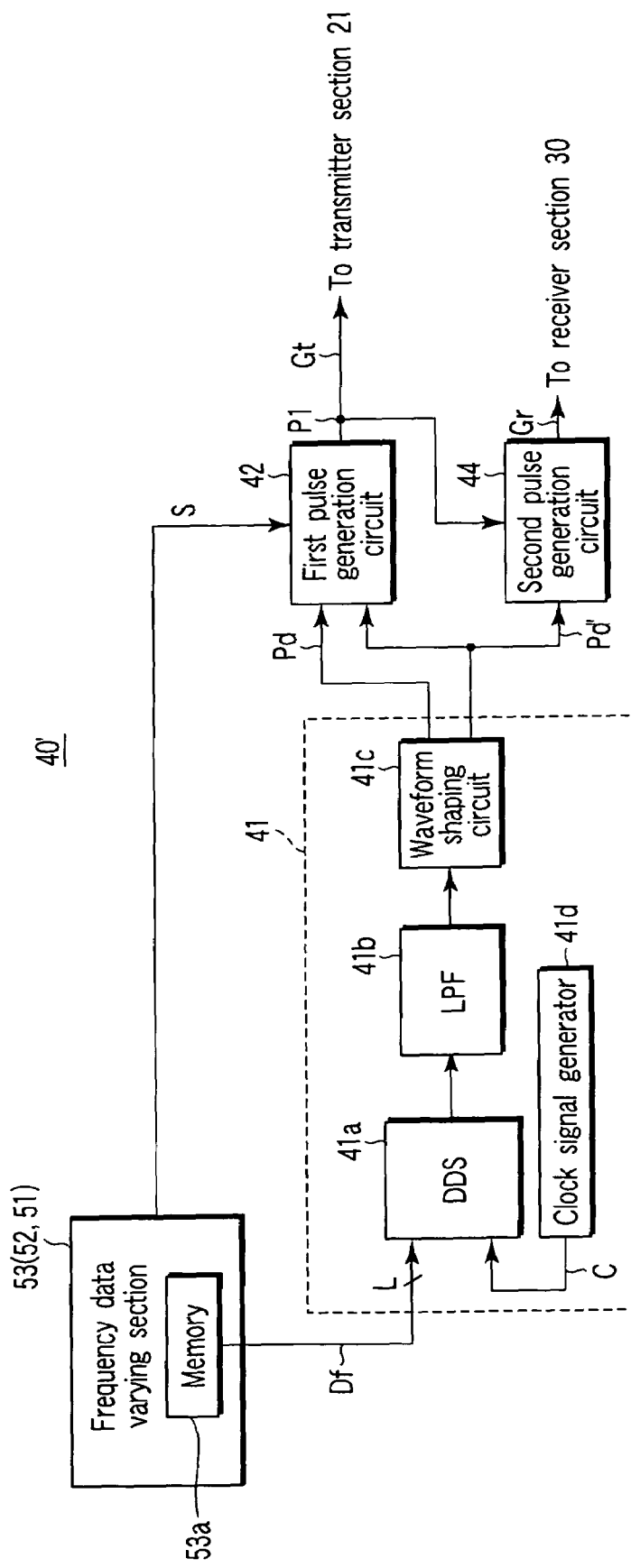
FIG. 13 is a block diagram showing a specific configuration of the trigger signal generating section as a configuration of important components of a short-range radar according to a second embodiment of the present invention.

FIG. 13 is a block diagram showing a specific configuration of a trigger signal generating section 40' as a configuration of important components of a short-range radar according to a second embodiment of the present invention.

In FIG. 13, the same components as those in the trigger signal generating section 40 according to the first embodiment shown in FIG. 7 are indicated by the same reference symbols, and explanation of them is omitted.

In the above-described first embodiment, the fixed delay circuit 43 is provided to reduce to zero a minimum value of delay time from a transmission timing to a reception timing.

However, if it is unnecessary to search an extremely short-distance region in a search range, it is also possible to omit the fixed delay circuit 43 and use as a transmission trigger signal Gt a first pulse P1 output from the first pulse generation circuit 42 as shown in FIG. 13.

By thus omitting the fixed delay circuit 43, an influence due to an error in delay time caused by temperature dependency of the fixed delay circuit 43 can be eliminated to perform further accurate search as a short-range radar.

A short-range radar 20 according to the present invention combining the above-described configurations of FIGS. 1 and 13 basically comprises:

a transmitter section 21 which radiates a short pulse wave Pt having a predetermined width into space 1 each time receiving a transmission trigger signal Gt;

a receiver section 30 which, when having received a reception trigger signal Gr, performs reception and detection processing on a reflected wave Pr of the short pulse wave Pt;

a variable-period pulse generator 41 including a direct digital synthesizer 41a which outputs a signal having a frequency corresponding to frequency data Df specified from an outside based on a search instruction, the variable-period pulse generator generating a variable-period pulse whose period changes in accordance with the frequency data Df;

a first pulse generation circuit 42 which receives the variable-period pulse generated by the variable-period pulse generator 41, and which outputs as the transmission trigger signal Gt a first pulse whose level shifts in a predetermined direction at a reference timing that is assumed to be a timing at which a level of the variable-period pulse shifts first in a predetermined direction;

a second pulse generation circuit 44 which receives the variable-period pulse generated by the variable-period pulse generator 41, and which outputs as the reception trigger signal Gr a second pulse whose level shifts in a predetermined direction at a timing when the level of the variable-period pulse has shifted in a direction opposite to the first predetermined direction after the reference timing;

a trigger signal generating section 40' including the variable-period pulse generator 41, the first pulse generation circuit 42, and the second pulse generation circuit 44, the trigger signal generating section outputting the transmission trigger signal Gt from the first pulse generation circuit 42 to the transmitter section 21 each time the variable-period pulse generator 41 receives the search instruction and also outputting from the second pulse generation circuit 44 to the receiver section 30 as the reception trigger signal Gr a signal that is delayed by an arbitrary lapse of time with respect to the transmission trigger signal Gt in order to give delay time Tr between transmission and reception; and a frequency data varying section 54 including a memory 53a in which a relationship between the frequency data Df and the delay time Tr between transmission and reception is stored beforehand in a form of a table of computation expressions or calculation results, the frequency data varying section varying the frequency data Df destined for the direct digital synthesizer 41a in the variable-period pulse generator 41 based on the relationship between the frequency data Df and the delay time Tr between transmission and reception, thereby enabling arbitrarily varying delay time of the reception trigger signal Gr with respect to the transmission trigger signal Gt.

A method of controlling the short-range radar according to the present invention combining the above-described configurations of FIGS. 1 and 13 basically comprises:

a step of preparing a transmitter section 21 and a receiver section 30;

a step of radiating a short pulse wave Pt having a predetermined width into space 1 by using the transmitter section 21 each time a transmission trigger signal Gt is received;

a step of receiving a reception trigger signal Gr by using the receiver section 30, to perform reception and detection processing on a reflected wave Pr of the short pulse wave Pt;

a step of generating a variable-period pulse whose frequency changes in accordance with the frequency data Df by using a direct digital synthesizer 41a which outputs a signal having a frequency corresponding to the frequency data Df specified from an outside based on a search instruction;

a step of outputting as the transmission trigger signal Gt a first pulse whose level shifts in a predetermined direction at a reference timing that is assumed to be a timing at which a level of the variable-period pulse shifts first in a predetermined direction;

a step of outputting as the reception trigger signal Gr a second pulse whose level shifts in a predetermined direction at a timing when the level of the variable-period pulse has shifted in a direction opposite to the first predetermined direction after the reference timing;

a step of, including: the step of generating the variable-period pulse; the step of outputting the first pulse as the transmission trigger signal Gt; and the step of outputting the second pulse as the reception trigger signal Gr, outputting the transmission trigger signal Gt to the transmitter section 21 in the step of outputting the first pulse as the transmission trigger signal Gt each time the search instruction is received in the step of generating the variable-period pulse and also outputting to the receiver section 30 as the reception trigger signal Gr a signal delayed by an arbitrary lapse of time with respect to the transmission trigger signal Gt in order to give delay time Tr between transmission and reception, in the step of outputting as the reception trigger signal Gr the second pulse delayed by an arbitrary lapse of time with respect to the transmission trigger signal Gt;

a step of storing beforehand in a memory 53*a* a relationship between the frequency data Df and the delay time Tr between transmission and reception in a form of a table of computation expressions or calculation results; and a step of varying the frequency data Df destined for the direct digital synthesizer 41*a* for use in the step of generating the variable-period pulse based on the relationship between the frequency data Df and the delay time Tr between transmission and reception stored in the memory 53*a*, thereby enabling arbitrarily varying delay time of the reception trigger signal Gr with respect to the transmission trigger signal Gt.

Therefore, according to the present invention as described above, it is possible to solve the problems of the prior art, thereby providing a short-range radar that has a simple configuration and low power dissipation and can arbitrarily change delay time between transmission and reception at a high time resolution, and a method of controlling the short-range radar.

The invention claimed is:

1. A short-range radar comprising:

a transmitter section which radiates a short pulse wave having a predetermined width into space each time receiving a transmission trigger signal;

a receiver section which performs reception and detection processing on a reflected wave of the short pulse wave when having received a reception trigger signal;

a variable-period pulse generator including a direct digital synthesizer which outputs a signal having a frequency corresponding to frequency data specified from an outside, the variable-period pulse generator generating a variable-period pulse whose period changes in accordance with the frequency data;

a first pulse generation circuit which receives the variable-period pulse generated by the variable-period pulse generator, and which outputs a first pulse whose level shifts in a predetermined direction as the transmission trigger signal at a reference timing that is assumed to be a timing at which a level of the variable-period pulse shifts in a predetermined direction first since a search instruction is input;

a second pulse generation circuit which receives the variable-period pulse generated by the variable-period pulse generator, and which outputs as the reception trigger signal a second pulse whose level shifts in a predetermined direction at a timing when the level of the variable-period pulse has shifted in a direction opposite to the first predetermined direction after the reference timing;

a trigger signal generating section including the variable-period pulse generator, the first pulse generation circuit, and the second pulse generation circuit, the trigger signal generating section outputting the transmission trigger signal from the first pulse generation circuit to the transmitter section each time the variable-period pulse generator receives the search instruction, and also outputting from the second pulse generation circuit to the receiver section as the reception trigger signal a signal that is delayed by an arbitrary lapse of time with respect to the transmission trigger signal in order to give delay time between transmission and reception; and a frequency data varying section including a memory in which a relationship between the frequency data and the delay time between transmission and reception is stored beforehand in a form of a table of computation expressions or calculation results, the frequency data varying section varying the frequency data destined for the direct digital synthesizer in the variable-period pulse generator based on the relationship between the frequency data and the delay time between transmission and reception stored in the memory, thereby enabling arbitrarily varying delay time of the reception trigger signal with respect to the transmission trigger signal.

2. The short-range radar according to claim 1, having a fixed delay circuit which gives a delay of a fixed lapse of time to the first pulse from the first pulse generation circuit, and which outputs it as the transmission trigger signal, characterized in that the second pulse generation circuit, when having received the variable-period pulse generated by the variable-period pulse generator, outputs the reception trigger signal at a timing when a lapse of time equal to an integral multiple of half a period of the variable-period pulse and longer than the fixed lapse of time has elapsed since the reference timing.

3. The short-range radar according to claim 1, characterized in that the receiver section comprises:

a branch circuit which divides in-phase a signal of the reflected wave of the short pulse wave radiated into the space by the transmitter section into first and second signals;

a linear multiplier which linear-multiplies the first and second signals that have been divided in-phase by the branch circuit; and a detector circuit configured by a low-pass filter which extracts a baseband component from an output signal of the linear multiplier, and the short-range radar further comprises:

a signal processing section which performs analysis processing on an object present in the space based on an output of the receiver section; and a control section which performs predetermined control on at least one of the transmitter section and the receiver section based on a result of analysis by the signal processing section.

4. The short-range radar according to claim 3, characterized in that the linear multiplier in the detector circuit is configured by a Gilbert mixer.

5. The short-range radar according to claim 3, characterized in that the receiver section has a sample-and-hold circuit which integrates an output signal of the detector circuit and which holds and outputs a result of the integration.

6. The short-range radar according to claim 5, characterized in that the control section variably controls an integration start timing and integration time of the sample-and-hold circuit based on a result of processing by the signal processing section.

7. The short-range radar according to claim 3, characterized in that
the transmitter section is provided with a power amplifier which amplifies the short pulse wave and the receiver section is provided with a low-noise amplifier which amplifies a signal of the reflected wave, and
the control section controls a gain of at least one of the power amplifier provided to the transmitter section and the low-noise amplifier provided to the receiver section such that a level of the signal of the reflected wave input to the detector circuit falls in a linear-operation range of the linear-multiplier in the receiver section.

8. The short-range radar according to claim 1, characterized in that the transmitter section is provided with a pulse generator which generates a pulse signal having a predetermined width and an oscillator which oscillates and provides an output signal as the short pulse wave only in a period in which the pulse signal from the pulse generator is being input, the oscillator stopping oscillation in a period in which the pulse signal is not being input.

9. A short-range radar comprising:
a transmitter section which radiates a short pulse wave having a predetermined width into space each time receiving a transmission trigger signal;
a receiver section which performs reception and detection processing on a reflected wave of the short pulse wave when having received a reception trigger signal;
a variable-period pulse generator including a direct digital synthesizer which outputs a signal having a frequency corresponding to frequency data specified from an outside based on a search instruction, the variable-period pulse generator generating a variable-period pulse whose period changes in accordance with the frequency data;
a first pulse generation circuit which receives the variable-period pulse generated by the variable-period pulse generator, and which outputs a first pulse at a reference timing that is assumed to be a timing at which a level of the variable-period pulse rises or falls;
a fixed delay circuit which gives a delay of a fixed lapse of time to the first pulse from the first pulse generation circuit, and which outputs it as the transmission trigger signal;
a second pulse generation circuit which receives the variable-period pulse generated by the variable-period pulse generator, and which outputs the reception trigger signal at a timing when a lapse of time that is equal to an integral multiple of half a period of the variable-period pulse and longer than the fixed lapse of time has elapsed since the reference timing;
a trigger signal generating section including the variable-period pulse generator, the first pulse generation circuit, the fixed delay circuit, and the second pulse generation circuit, the trigger signal generating section outputting the transmission trigger signal from the fixed delay circuit to the transmitter section each time the variable-period pulse generator receives the search instruction, and also outputting from the second pulse generation circuit to the receiver section as the reception trigger signal a signal that is delayed by an arbitrary lapse of time with respect to the transmission trigger signal in order to give delay time between transmission and reception; and a frequency data varying section including a memory in which a relationship between the frequency data and the delay time between transmission and reception is stored beforehand in a form of a table of computation expressions or calculation results, the frequency data varying section varying the frequency data destined for the direct digital synthesizer in the variable-period pulse generator based on the relationship between the frequency data and the delay time between transmission and reception stored in the memory, thereby enabling arbitrarily varying delay time of the reception trigger signal with respect to the transmission trigger signal.

10. The short-range radar according to claim 9, characterized in that
the first pulse generation circuit, when having received the variable-period pulse generated by the variable-period pulse generator, outputs a first pulse whose level rises at the reference timing, and
the second pulse generation circuit, when having received the variable-period pulse generated by the variable-period pulse generator, outputs as the reception trigger signal a signal whose level rises at a timing when a lapse of time equal to an integral multiple of half a period of the variable-period pulse and longer than the fixed lapse of time has elapsed since the reference timing.

11. The short-range radar according to claim 9, characterized in that the receiver section comprises:
a branch circuit which divides in-phase a signal of the reflected wave of the short pulse wave radiated into the space by the transmitter section into first and second signals;
a linear multiplier which linear-multiplies the first and second signals that have been divided in-phase by the branch circuit; and
a detector circuit configured by a low-pass filter which extracts a baseband component from an output signal of the linear multiplier, and
the short-range radar further comprises:
a signal processing section which performs analysis processing on an object present in the space based on an output of the receiver section; and
a control section which performs predetermined control on at least one of the transmitter section and the receiver section based on a result of analysis by the signal processing section.

12. The short-range radar according to claim 11, characterized in that the linear multiplier in the detector circuit is configured by a Gilbert mixer.

13. The short-range radar according to claim 11, characterized in that the receiver section has a sample-and-hold circuit which integrates an output signal of the detector circuit and which holds and outputs a result of the integration.

14. The short-range radar according to claim 13, characterized in that the control section variably controls an integration start timing and integration time of the sample-and-hold circuit based on a result of processing by the signal processing section.

15. The short-range radar according to claim 11, characterized in that
the transmitter section is provided with a power amplifier which amplifies the short pulse wave and the receiver section is provided with a low-noise amplifier which amplifies a signal of the reflected wave, and
the control section controls a gain of at least one of the power amplifier provided to the transmitter section and the low-noise amplifier provided to the receiver section such that a level of the signal of the reflected wave input to the detector circuit falls in a linear-operation range of the linear-multiplier in the receiver section.

16. The short-range radar according to claim 9, characterized in that the transmitter section is provided with a pulse generator which generates a pulse signal having a predetermined width and an oscillator which oscillates and provides an output signal as the short pulse wave only in a period in which the pulse signal from the pulse generator is being input, the oscillator stopping oscillation in a period in which the pulse signal is not being input.

17. A short-range radar control method comprising:
a step of preparing a transmitter section and a receiver section;
a step of radiating a short pulse wave having a predetermined width into space by using the transmitter section each time a transmission trigger signal is received;
a step of receiving a reception trigger signal by using the receiver section, to perform reception and detection processing on a reflected wave of the short pulse wave;
a step of generating a variable-period pulse whose frequency changes in accordance with frequency data specified from outside, by using a direct digital synthesizer which outputs a signal having a frequency corresponding to the frequency data based on a search instruction;
a step of outputting as the transmission trigger signal a first pulse whose level shifts in a predetermined direction at a reference timing that is assumed to be a timing at which a level of the variable-period pulse shifts first in a predetermined direction;
a step of outputting as the reception trigger signal a second pulse whose level shifts in a predetermined direction at a timing when the level of the variable-period pulse has shifted in a direction opposite to the first predetermined direction after the reference timing;
a step of, including: the step of generating the variable-period pulse; the step of outputting the first pulse as the transmission trigger signal; and the step of outputting the second pulse as the reception trigger signal, outputting the transmission trigger signal to the transmitter section in the step of outputting the first pulse as the transmission trigger signal each time the search instruction is received in the step of generating the variable-period pulse, and also outputting to the receiver section as the reception trigger signal a signal delayed by an arbitrary lapse of time with respect to the transmission trigger signal in order to give delay time between transmission and reception, in the step of outputting the second pulse as the reception trigger signal;
a step of storing beforehand in a memory a relationship between the frequency data and the delay time between transmission and reception in a form of a table of computation expressions or calculation results; and
a step of varying the frequency data destined for the direct digital synthesizer for use in the step of generating the variable-period pulse based on the relationship between the frequency data and the delay time between transmission and reception stored in the memory, thereby enabling arbitrarily varying delay time of the reception trigger signal with respect to the transmission trigger signal.

18. The short-range radar control method according to claim 17, characterized in that
the step of outputting the first pulse as the transmission trigger signal has a step of giving a delay of a fixed lapse of time to the first pulse by using a fixed delay circuit, and
the step of outputting the second pulse as the reception trigger signal outputs the reception trigger signal at a timing when a lapse of time equal to an integral multiple of half a period of the variable-period pulse and longer than the fixed lapse of time has elapsed since the reference timing.

19. The short-range radar control method according to claim 17, characterized in that
the step of performing the reception and detection processing comprises:
a step of receiving a signal of the reflected wave of the short pulse wave radiated into the space by using the receiver section and dividing in-phase the signal of the reflected wave into first and second signals;
a step of linear-multiplying the first and second signals by using a linear multiplier and outputting a linear-multiplied signal;
a step of extracting a baseband component from the linear-multiplied signal;
a step of performing analysis processing on an object present in the space based on the baseband component; and
a step of performing predetermined control on at least one of the transmitter section and the receiver section based on a result of the analysis processing.

20. The short-range radar control method according to claim 19, characterized in that the step of outputting the linear-multiplied signal comprises:
a step of performing linear multiplication for the purpose of outputting the linear-multiplied signal by using a Gilbert mixer as the linear multiplier.

21. The short-range radar control method according to claim 19, characterized by further comprising a step of integrating the baseband component and holding and outputting a result of the integration before the step of performing analysis processing.

22. The short-range radar control method according to claim 21, characterized in that the step of integrating the baseband component comprises:
a step of performing variable control on a timing for starting integration of the baseband component and integration time based on a result of the analysis processing.

23. The short-range radar control method according to claim 19, characterized in that
the transmitter section is provided with a power amplifier which amplifies the short pulse wave and the receiver section is provided with a low-noise amplifier which amplifies a signal of the reflected wave, and
the step of performing the predetermined control comprises:
a step of controlling a gain of at least one of the power amplifier provided to the transmitter section and the low-noise amplifier provided to the receiver section such that a level of the signal of the reflected wave falls in a linear-operation range of the linear-multiplier in the receiver section.

24. The short-range radar control method according to claim 17, characterized in that the step of radiating the short pulse wave into the space by using the transmitter section comprises:
a step of generating a pulse signal having a predetermined width;
a step of performing an oscillation operation only in a period in which the pulse signal is being input, and outputting an output signal as the short pulse wave; and
a step of stopping the oscillation operation in a period in which the pulse signal is not input, to avoid output of the output signal as the short pulse signal.

25. A short range radar control method comprising:
a step of preparing a transmitter section and a receiver section;
a step of radiating a short pulse wave having a predetermined width into space by using the transmitter section each time a transmission trigger signal is received;
a step of receiving a reception trigger signal by using the receiver section, to perform reception and detection processing on a reflected wave of the short pulse wave;
a step of generating a variable-period pulse whose frequency changes in accordance with frequency data specified from outside, by using a direct digital synthesizer which outputs a signal having a frequency corresponding to the frequency data based on a search instruction;
a step of outputting a first pulse at a reference timing that is assumed to be a timing at which the variable-period pulse rises or falls;
a step of giving a delay of a fixed lapse of time to the first pulse, and outputting it as the transmission trigger signal;
a step of outputting the reception trigger signal at a timing when a lapse of time that is equal to an integral multiple of half a period of the variable-period pulse and longer than the fixed lapse of time has elapsed since the reference timing;
a step of, including: the step of generating the variable-period pulse; the step of outputting the first pulse; the step of giving the fixed lapse of time to the first pulse and outputting it as the transmission trigger signal; and the step of outputting the reception trigger signal at a timing when the lapse of time longer than the fixed lapse of time has elapsed, outputting the transmission trigger signal to the transmitter section in the step of giving the fixed lapse of time to the first pulse and outputting it as the transmission trigger signal each time the search instruction is received in the step of generating the variable-period pulse and also outputting to the receiver section as the reception trigger signal a signal delayed by an arbitrary lapse of time with respect to the transmission trigger signal at a timing when the lapse of time longer than the fixed lapse of time has elapsed in order to give delay time between transmission and reception, in the step of outputting as the reception trigger signal;
a step of storing beforehand in a memory a relationship between the frequency data and the delay time between transmission and reception in a form of a table of computation expressions or calculation results; and
a step of varying the frequency data destined for the direct digital synthesizer for use in the step of generating the variable-period pulse based on the relationship between the frequency data and the delay time between transmission and reception stored in the memory, thereby enabling arbitrarily varying delay time of the reception trigger signal with respect to the transmission trigger signal.

26. The short range radar control method according to claim 25, characterized in that
the step of generating the first pulse outputs a first pulse whose level rises at the reference timing, and
the step of outputting the reception trigger signal at the timing when the lapse of time longer than the fixed lapse of time has elapsed outputs as the reception trigger signal a signal whose level rises at a timing when a lapse of time equal to an integral multiple of half a period of the variable-period pulse and longer than the fixed lapse of time has elapsed since the reference timing.

27. The short-range radar control method according to claim 25, characterized in that
the step of performing the reception and detection processing comprises:
a step of receiving a signal of the reflected wave of the short pulse wave radiated into the space by using the receiver section and dividing in-phase the signal of the reflected wave into first and second signals;
a step of linear-multiplying the first and second signals by using a linear multiplier and outputting a linear-multiplied signal;
a step of extracting a baseband component from the linear-multiplied signal;
a step of performing analysis processing on an object present in the space based on the baseband component; and
a step of performing predetermined control on at least one of the transmitter section and the receiver section based on a result of the analysis processing.

28. The short-range radar control method according to claim 27, characterized in that the step of outputting the linear-multiplied signal comprises:
a step of performing linear multiplication for the purpose of outputting the linear-multiplied signal by using a Gilbert mixer as the linear multiplier.

29. The short-range radar control method according to claim 27, characterized by further comprising a step of integrating the baseband component and holding and outputting a result of the integration before the step of performing the analysis processing.

30. The short-range radar control method according to claim 29, characterized in that the step of integrating the baseband component comprises:
a step of performing variable control on a timing for starting integration of the baseband component and integration time based on a result of the analysis processing.

31. The short-range radar control method according to claim 27, characterized in that
the transmitter section is provided with a power amplifier which amplifies the short pulse wave and the receiver section is provided with a low-noise amplifier which amplifies a signal of the reflected wave, and
the step of performing the predetermined control comprises:
a step of controlling a gain of at least one of the power amplifier provided to the transmitter section and the low-noise amplifier provided to the receiver section such that a level of the signal of the reflected wave falls in a linear-operation range of the linear-multiplier in the receiver section.

32. The short-range radar control method according to claim 25, characterized in that the step of radiating the short pulse wave into the space by using the transmitter section comprises:
a step of generating a pulse signal having a predetermined width;
a step of performing an oscillation operation only in a period in which the pulse signal is being input, and outputting an output signal as the short pulse wave; and
a step of stopping the oscillation operation in a period in which the pulse signal is not input, to avoid output of the output signal as the short pulse signal.

* * * * *

UNITED STATES PATENT AND TRADEMARK OFFICE
CERTIFICATE OF CORRECTION

PATENT NO. : 7,420,503 B2  Page 1 of 1
APPLICATION NO. : 10/581935
DATED : September 2, 2008
INVENTOR(S) : Masaharu Uchino It is certified that error appears in the above-identified patent and that said Letters Patent is hereby corrected as shown below:

On the title page:

Under Item (73) Assignee, after "Anritsu Corporation, Tokyo (JP)", insert -- and Matsushita Electric Industrial Co., Ltd., Osaka (JP) --.

Signed and Sealed this

Eleventh Day of August, 2009

David J. Kappos
*Director of the United States Patent and Trademark Office*